(12) United States Patent
Kataoka et al.

(10) Patent No.: US 6,834,632 B2
(45) Date of Patent: Dec. 28, 2004

(54) STOP AND START CONTROL APPARATUS OF INTERNAL COMBUSTION ENGINE

(75) Inventors: Kenji Kataoka, Susono (JP); Yasushi Kusaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/762,529

(22) Filed: Jan. 23, 2004

(65) Prior Publication Data

US 2004/0159297 A1 Aug. 19, 2004

(30) Foreign Application Priority Data

Feb. 13, 2003 (JP) .................................... 2003-035036

(51) Int. Cl.[7] .............................................. F02N 17/08
(52) U.S. Cl. ................................ 123/179.4; 123/179.3; 123/179.28
(58) Field of Search .................... 123/179.4, 179.5, 123/179.3, 179.16, 179.28; 180/65.2, 65.3, 65.4; 318/445

(56) References Cited

U.S. PATENT DOCUMENTS

| | | | | |
|---|---|---|---|---|
| 4,364,343 A | * | 12/1982 | Malik ....................... | 123/179.4 |
| 6,032,632 A | * | 3/2000 | Bolenz et al. ............ | 123/179.3 |
| 6,098,585 A | * | 8/2000 | Brehob et al. ........... | 123/179.5 |
| 6,218,799 B1 | * | 4/2001 | Hori ........................... | 318/446 |
| 6,453,863 B1 | * | 9/2002 | Pels et al. ................. | 123/179.3 |
| 6,453,864 B1 | * | 9/2002 | Downs et al. ............ | 123/179.3 |
| 6,647,955 B1 | * | 11/2003 | Sieber ......................... | 123/322 |

FOREIGN PATENT DOCUMENTS

| | | | |
|---|---|---|---|
| DE | 31 17 144 a1 | * | 3/1983 |
| JP | A 2002-4985 | | 1/2002 |

* cited by examiner

*Primary Examiner*—Mahmoud Gimie
*Assistant Examiner*—Arnold Castro
(74) *Attorney, Agent, or Firm*—Oliff & Berridge, PLC

(57) ABSTRACT

A stop and start control apparatus of an internal combustion engine prevents fuel supplied in a specific cylinder at the time of stopping the engine from being discharged in an unburned state. When an ignition switch is turned off in a state that the unburned fuel is sealed in the combustion chamber of a specific cylinder during idling stop, the unburned fuel is combusted to prevent the unburned fuel from being discharged. The vibration occurring at that time can be suppressed by rotating the motor generator in the counter direction to the rotation direction of the crankshaft. After the unburned fuel is sealed in the combustion chamber of the specific cylinder, if it is estimated that the unburned fuel is discharged, the exhaust valve corresponding to the specific cylinder is closed at the predetermined timing, or the unburned fuel is combusted, whereby the unburned fuel is prevented from being discharged. Thus, deterioration of emission can be avoided.

12 Claims, 16 Drawing Sheets

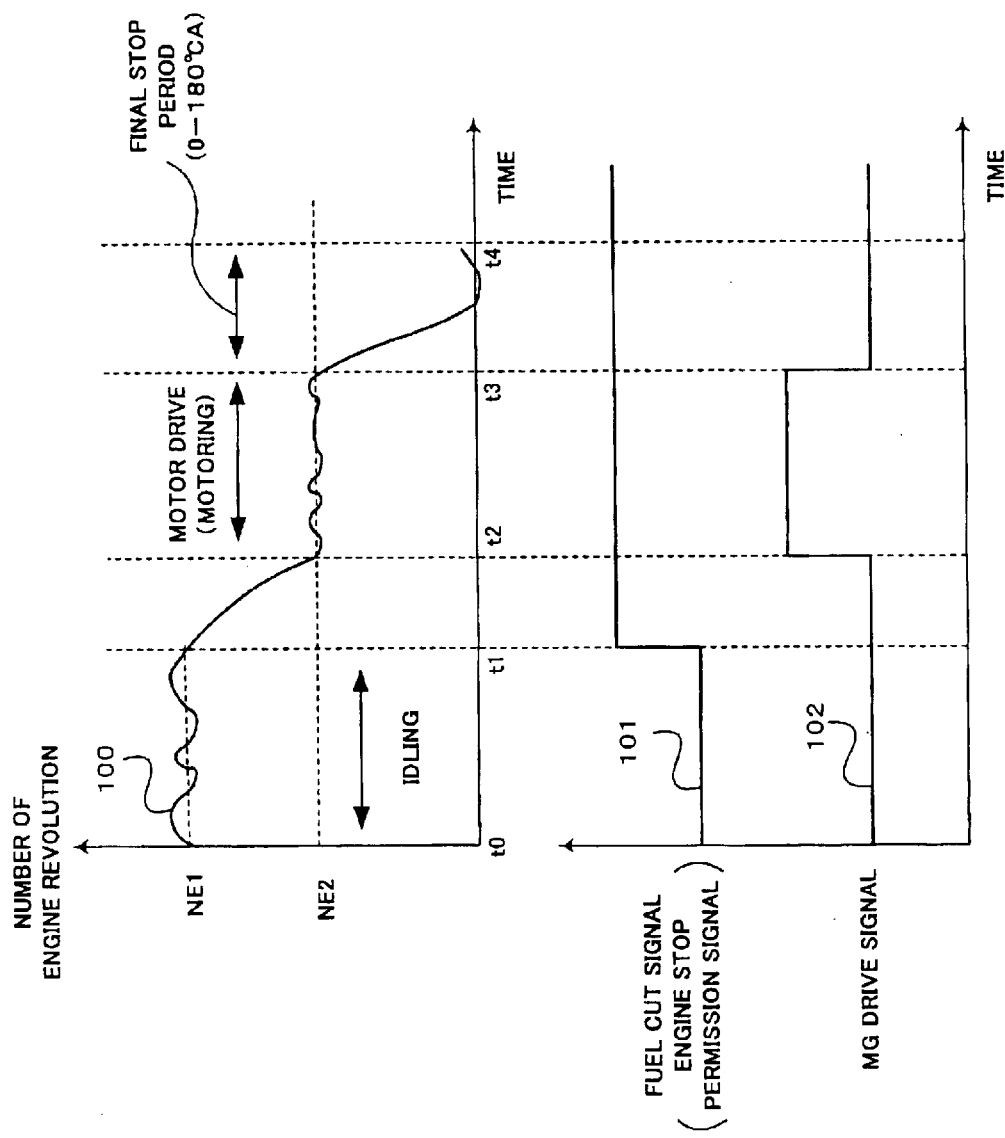

STOP AND START CONTROL APPARATUS OF INTERNAL COMBUSTION ENGINE

BACKGROUND OF THE INVENTION

1. Field of the Invention

The present invention relates to a stop and start control apparatus of an internal combustion engine, and relates to an discharge prevention technique of an unburned fuel, which prevents fuel supplied to a specific cylinder from being discharged in an unburned state at the time of stopping the internal combustion engine.

2. Description of the Related Art

Recently, there is known an engine stop and start control apparatus for automatically stopping an internal combustion engine (hereinafter, also referred to as "engine") when the vehicle stops and for automatically restarting the engine to start the vehicle when an instruction to start is given in the stopped state, in order to reduce a fuel consumption amount and exhaust gas during idling, from the viewpoint of environmental conservation, resources and energy saving or the like. This control is also called "idling stop" or the like.

It is known that, when the idling stop is automatically carried out, it is effective to control the stop position of the engine in order to minimize required energy at the time of starting the engine. Minimizing the required energy at the time of starting the engine brings about the advantages that an engine starting device used after idling stop such as a motor generator (MG) can be miniaturized, and the useful life of a battery can be elongated by reducing the electric energy.

As a method for quickly starting the engine, there is known an engine starting apparatus in which fuel is supplied into a combustion chamber of a cylinder at an expansion stroke at the time the engine is stopped, and then the fuel is combusted at the time the engine is started. By utilizing combustion pressure generated at this time, the cranking torque at the time of starting the engine is generated. For example, see Japanese Patent Application Laid-Open under No. 2002-4985.

However, even if the fuel is supplied to the combustion chamber of the cylinder at the expansion stroke at the time the engine is stopped, if a driver turns off an ignition switch thereafter, the driver should activate a starter by turning on the ignition switch at the time of the next engine start, and the engine is started by the torque of the starter generated at that time.

In this situation, since the crankshaft is rotated by the cranking operation of the starter, the fuel supplied in the combustion chamber of the cylinder is discharged through an exhaust port without being burned, which causes the problem of deterioration of emission.

SUMMARY OF THE INVENTION

The present invention is made in view of the above-described problem, and its object is to provide a stop and start control apparatus of an internal combustion engine, which prevents fuel supplied into a specific cylinder at the time of stopping the engine from being discharged in an unburned state.

According to one aspect of the present invention, there is provided a stop and start control apparatus of an internal combustion engine including: a stop control unit for performing a stop control by supplying fuel into a combustion chamber of a cylinder which is in a compression stroke and/or in an expansion stroke at a time of stopping the engine; an unburned fuel discharge preventing unit for preventing discharge of the fuel when it is estimated that the fuel in the combustion chamber of the cylinder is discharged in an unburned state, at a time of a stop control of the engine; a combusting unit for combusting the fuel supplied to the combustion chamber of the cylinder at a time of starting the engine; and a starting unit for starting the engine by utilizing combustion pressure obtained from the combusting unit and/or a motor.

The above-described stop and start control apparatus can be preferably used, for example, in an idling stop control and the like. In the stop control of the engine, fuel is supplied to the combustion chamber of the cylinder which is in the compression stroke and/or in the expansion stroke at the time of stopping the engine. The fuel is supplied, in advance, to generate a driving force at the time of starting the engine next time. At the time of starting the engine, the engine is started with the combustion pressure obtained by combusting the fuel supplied into the combustion chambers and/or the driving force by the motor. However, when the fuel which is thus supplied to the cylinder in advance is discharged without being combusted, deterioration of emission is likely to occur. Therefore, such a discharge of the fuel should be prevented. One example of the case where the fuel supplied in advance to the cylinder is discharged without being combusted is that the ignition switch is turned off when the engine stops with the fuel being supplied to the cylinder in the compression stroke and/or in the expansion stroke. Another example thereof is that the stop control fails and the engine cannot stop at the scheduled engine stop position.

In a preferred example, it is estimated that the fuel is discharged in the unburned state when an ignition switch is turned off during the stop control of the engine. When the ignition switch is turned off, the next engine start is performed by the cranking using the motor. When the engine is started in this case, the crankshaft is turned by the motor, and therefore there is the possibility that the fuel, which is sealed in the combustion chamber of the cylinder which is in the compression stroke and/or in the expansion stroke at the time of stopping the engine, is discharged through the exhaust port without being burned. Accordingly, the case in which it is estimated that the fuel is discharged in the unburned state can be made the case in which the ignition switch is turned off during the stop control of the engine.

The stop control unit may further include: a unit for supplying fuel, during operation of the engine, into the combustion chamber of the cylinder which is in the compression stroke and/or in the expansion stoke; and a unit for adjusting a crank angle position so that the engine stops at the cylinder which is in the compression stroke and/or in the expansion stroke, at the time of stopping the engine. In this case, in stopping operation of the engine, the cylinder of which combustion chamber is fed with fuel stops in the compression stroke and/or in the expansion stroke. This allows the generation of driving force to start the engine next time by igniting and burning the fuel in the cylinder.

The unburned fuel discharge preventing unit may prevent the fuel supplied to the combustion chamber of the cylinder which is in the compression stroke or in the expansion stroke, when it is estimated that the cylinder which is in the compression stroke or in the expansion stroke at the time of stopping the engine passes an exhaust stroke. The stop control of the engine is to supply the fuel to the cylinder which is in the compression stroke or in the expansion stroke at the time of engine stop, and to combust the fuel to generate the driving force at the time of starting the engine next time. However, when the stop control fails and the cylinder in which the fuel is supplied at the time of stopping the engine passes the exhaust stroke, the unburned fuel is discharged. Therefore, the stop control prevents this.

The engine may further include an opening and closing unit for opening and closing an exhaust valve, and when it is estimated that the cylinder, which is in the compression stroke or the expansion stroke at the time of stopping the engine, passes the exhaust stroke, the opening and closing unit prevents the fuel supplied to the combustion chamber of the cylinder which is in the compression stroke or in the expansion stroke from being discharged. According to this feature, when it is estimated that the cylinder to which the fuel is supplied reaches the exhaust stroke in the stop control, the unburned fuel is prevented from being discharged by closing the exhaust valve.

The unburned fuel discharge preventing unit may prevent discharge of the fuel by combusting the fuel by the combusting unit before the fuel supplied to the combustion chamber of the cylinder which is in the compression stroke or in the expansion stroke is discharged, when it is estimated that the cylinder which is in the compression stroke or the expansion stroke at the time of stopping the engine passes the exhaust stroke. According to this feature, when it is estimated that the cylinder to which the fuel is supplied in the stop control reaches the exhaust stroke, the unburned fuel is prevented from being discharged by compulsorily combusting the unburned fuel.

In a preferred embodiment, the starting unit may start the engine by utilizing combustion pressure obtained from the combusting unit when a first starting condition is established, and the unburned fuel discharge preventing unit may prevent discharge of the fuel by combusting the fuel by the combusting unit before the fuel inside the combustion chamber of the cylinder is discharged in the unburned state.

In another preferred embodiment, the starting unit may start the engine by utilizing combustion pressure obtained from the combusting unit and the motor, and starting supply of the fuel to the engine in a predetermined period, when a second starting condition is established. The unburned fuel discharge preventing unit may prevent discharge of the fuel by combusting the fuel by the combusting means, before the fuel in the combustion chamber of the cylinder is discharged in an unburned state.

The stop and start control apparatus of the internal combustion engine may further include a torque absorbing unit for absorbing an engine torque which is generated when the fuel in the combustion chamber of the cylinder is combusted by the combusting unit. Thus, the torque generated when the unburned fuel is burned by the combustion unit can be absorbed to suppress vibration and the like of the vehicle.

The torque absorbing unit may apply torque by the motor in a counter rotation direction to a rotation direction of the engine rotated by receiving the torque generated by the combustion of the fuel. According to this feature, the torque absorbing unit can be made, for example, a motor. By giving the driving torque of such a motor in the counter rotation direction to the rotation direction of the engine, the vibration generated due to the combustion of the unburned fuel can be canceled off and eliminated.

In a preferred specific example, the engine may further include a unit for displaying an alarm at a time of execution of an operation by the unburned fuel discharge preventing unit. The alarm display according to this example is to notify the driver that special processing to combust the unburned fuel is being performed, after turning off the ignition switch, and it is displayed on an operation panel or the like so that the driver can recognizes it at a glance. Consequently, by displaying such an alarm when the unburned fuel discharge preventing unit is in operation, even if the engine temporarily starts after the ignition switch is turned off, the driver can recognize that this is not caused by abnormality of the engine, but the special processing is being executed.

The engine may include a unit for stopping the engine after the unburned fuel discharge preventing unit finishes the operation. According to this feature, the engine can be naturally stopped by the inertia energy which the engine has and which is obtained from the combustion pressure after the unburned fuel is combusted.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 5 is a graph showing a transition of a number of engine revolution by the engine stop control;

DETAILED DESCRIPTION OF THE PREFERRED EMBODIMENT

[Configuration of Vehicle]

First, the description will be given of a schematic configuration of a vehicle to which a start control method of an internal combustion engine according to the present invention is applied. A stop control apparatus of the internal combustion engine according to the present invention is intended for so-called "economic-running" vehicles, hybrid vehicles and the like to which idling stop technique is applied. "An economic-running vehicle" is a vehicle which is equipped with an electric motor (motor generator) mainly for the purpose of starting the engine and which automatically restarts the engine by the motor generator after stopping the engine by the idling stop control. "A hybrid vehicle" is a power train using an engine and a motor generator as power sources. In a hybrid vehicle, both the engine and the motor generator work in combination in accordance with a running state, or are separately used, and power performance which is smooth and excellent in response can be obtained.

Figure 1:
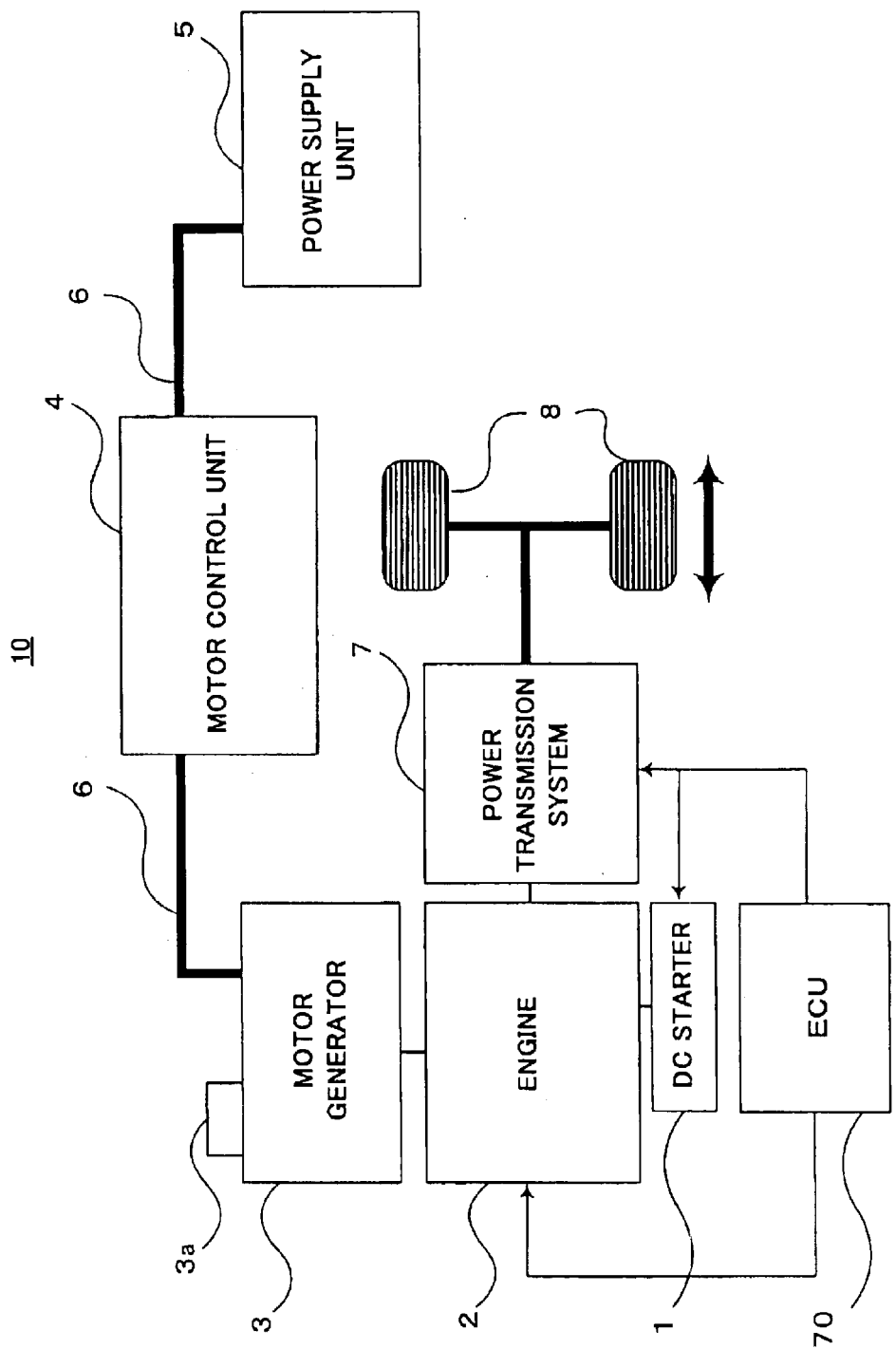
FIG. 1 shows a system configuration of a vehicle, which performs an engine stop control according to the present invention.

FIG. 1 shows a system configuration of a vehicle 10 according to the present invention.

As shown in FIG. 1, the vehicle 10 includes a DC starter 1, an engine 2, a motor generator 3 which generates electricity by a driving force outputted from the engine 2 and is drivable as a cell motor on the occasion of starting the engine 2, a motor control unit 4 to control the motor generator 3 and the like, a power supply unit 5 for exchanging electric power with the motor generator 3 and the like via the motor control unit 4, a power supply cable 6 for connecting the motor generator 3, the motor control unit 4 and the power supply unit 5, respectively, a power transmission system 7 for transmitting a driving force generated from the engine 2 to wheels, and the wheels 8.

Next, each of the above-described units will be explained with reference to FIG. 1.

The DC starter 1 is a dc-type cell motor for starting the engine 2. The DC starter 1 has a shaft, receives a power supply from a 12V power supply unit when an ignition switch is turned to an ON state, and rotates the shaft. By the rotation of the shaft of the DC starter 1, a crankshaft of the engine 2 is rotated and the engine 2 is started. Specifically, a pinion gear is mounted on a tip end portion of the shaft of the DC starter 1. The pinion gear is meshed with a ring gear of a fly wheel provided at the crankshaft of the engine 2. Consequently, when the DC starter 1 receives a power supply from the 12V power supply unit by the start of the engine 2, the pinion gear is meshed with the ring gear of the flywheel and rotated to rotate the flywheel. As a result, the crankshaft with a predetermined number of pistons being connected is rotated, and therefore the engine 2 can be started by the rotational driving force. Driving the crankshaft to start the engine is called "cranking".

The engine 2 is the internal combustion engine for generating power by exploding air-fuel mixtures (hereinafter simply referred to as "mixture") in cylinders. There are gasoline engines with gasoline as a fuel, diesel engines with light oil and the like as a fuel, and the like as the internal combustion engines. As the gasoline engines, there are four-cycle gasoline engines which complete one cycle of intake, compression, expansion and exhaust during two rotations of crankshaft to generate power, and two-cycle gasoline engines which complete the aforementioned one cycle during one rotation of crankshaft. The vehicle 10 in this embodiment is assumed to be the four-cycle gasoline engine.

Figure 2:
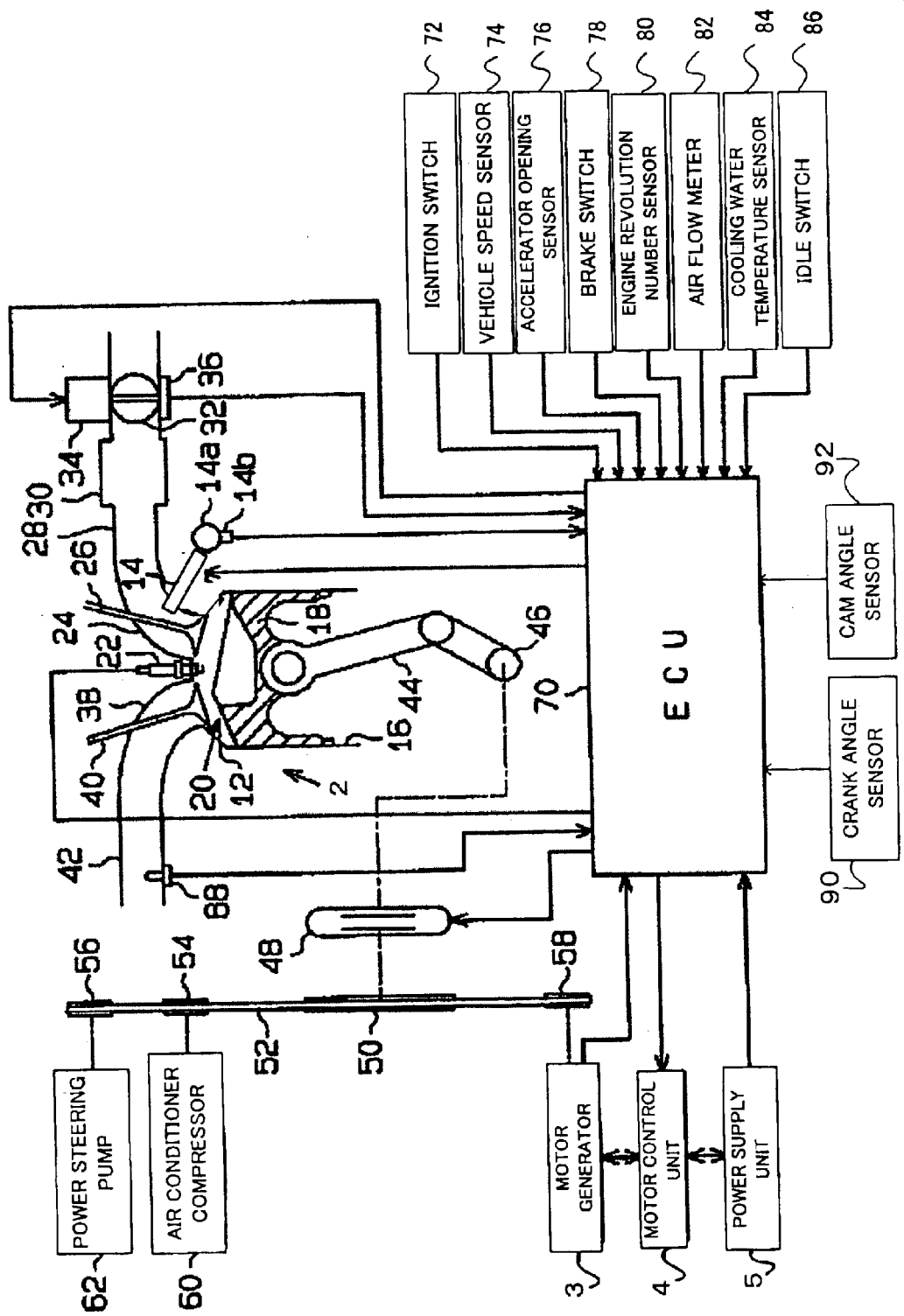
FIG. 2 is a schematic block diagram of an engine according to the present invention.

FIG. 2 shows one example of a schematic configuration of the engine 2.

An intake port 24 formed at a cylinder head 12 is opened and closed by an intake valve 26. Intake air is supplied into the intake port 24 via an intake passage 28. The intake passage 28 is provided with a surge tank 30, and a throttle valve 32 is provided at an upstream of the surge tank 30. An opening (throttle opening TA) of the throttle valve 32 is adjusted by an electric motor 34, and the throttle opening TA is detected by a throttle opening sensor 36.

The engine 2 is a so-called port-injection type engine, and the intake port 24 is provided with a fuel injection valve 14. An air-fuel mixture is generated by the intake air inside the intake port 24 and the fuel injected into the intake port 24, and is introduced into the combustion chamber 20 partitioned by the cylinder block 16, the piston 18 and the cylinder head 12. The ignition plug 22 is disposed at a ceiling portion of the combustion chamber 20, and ignites the mixture introduced from the intake port 24. High pressure fuel is supplied to the fuel injection valve 14 from a high pressure fuel pump (not shown) via a delivery pipe 14a. This enables the injection of fuel into the combustion chamber 20 from the fuel injection valve 14 even in the last period of the compression stroke. Fuel pressure in the delivery pipe 14a is detected by the fuel pressure sensor 14b.

The exhaust port 38 formed at the cylinder head 12 is opened and closed by the exhaust valve 40. Exhaust gas discharged to the exhaust port 38 from the combustion chamber 20 is discharged to the outside via the exhaust passage 42, an exhaust gas purifying catalyst (not shown) and the like.

Reciprocal movement of the piston 18 generated by the combustion of the mixture inside the combustion chamber 20 is converted into rotational movement of the crankshaft 46 via the connecting rod 44. The crankshaft 46 transmits power to the wheels 8 via a torque converter and a transmission not shown.

Apart from such a power transmission system, one end of the crankshaft 46 is connected to the pulley 50 (hereinafter, also called "crankshaft pulley") via the electromagnetic clutch 48. The pulley 50 is capable of transmitting power to and from other three pulleys 54, 56 and 58 by the belt 52. In this example, the compressor 60 for an air conditioner is made drivable by the pulley 54, and the power steering pump 62 is made drivable by the pulley 56. The other pulley 58 (hereinafter, also called "MG pulley") is connected to the motor generator 3. The motor generator 3 has a function as a generator for generating power by the engine driving force from the side of the MG pulley 58, and a function as a motor for supplying the driving force of the motor generator 3 to the side of the MG pulley 58.

An ECU 70 (Engine Control Unit) mainly constructed with a microcomputer includes an input-output device, a storage device, a central processing unit and the like, and supervises and controls the whole system of the vehicle 10. The ECU 70 controls the vehicle 10 to be in an optimal condition based on input information from each sensor and the like provided on the engine 2. Specifically, the ECU 70 detects the fuel pressure from the aforementioned fuel pressure sensor 14b, the throttle opening TA from the throttle opening sensor 36, a revolving number of motor generator from a rotational frequency sensor included in the motor generator 3, the voltage of the power supply unit 5 or the current amount of the power supply unit 5 at the time of charge and discharge, a switching state of the ignition switch 72, a vehicle speed SPD from the vehicle speed sensor 74, a stamping or depressing amount on an accelerator pedal (accelerator opening ACCP) from the accelerator opening sensor 76, presence or absence of stamping on a brake pedal from the brake switch 78, a number of revolution of the crankshaft 46 (i.e., number of engine revolution NE) from an engine revolution number sensor 80, an intake air amount GA from the air flow meter 82, the engine cooling water temperature THW from the cooling water temperature sensor 84, presence or absence of stamping on the accelerator pedal from the idle switch 86, an air fuel ratio detection value Vox from the air fuel ratio sensor 88 provided in the exhaust passage 42, a rotation position of a camshaft from the cam angle sensor 92, and a rotation angle (crank angle) of the crankshaft from the crank angle sensor 90, respectively.

The crank angle sensor 90 is a magnetic type sensor or the like capable of detecting an object to be detected (for example, metal and the like), and is provided at a predetermined position near the crankshaft 46 in the engine 2. Namely, a gear with projections and depressions being formed on an outer circumference (hereinafter, called "signal rotor") is attached at a predetermined position on the crankshaft 46, and the crank angle sensor 90 is provided at an appropriate position to detect the number of teeth of the signal rotor. The crank angle sensor 90 can detect the rotation angle of the crankshaft 46 (hereinafter, called "crank angle") with resolution of, for example, about 10° to 30° CA. When the crankshaft 46 is rotated, the signal rotor also rotates in synchronization with the crankshaft 46. In this situation, the crank angle sensor 90 detects the number of teeth of the signal rotor and outputs it to the ECU 70 and the like as a pulse signal. The ECU 70 counts the pulse signal outputted from the crank angle sensor 90, and converts it into a crank angle. Thus, the ECU 70 and the like detect the crank angle. The crank angle sensor 90 is directly provided in the engine 2, and therefore it can detect the crank angle as an absolute angle.

The crank angle sensor 90 outputs one pulse signal to the ECU 70 and the like when it detects one of teeth of the signal rotor. Consequently, the pulse signal outputted from the crank angle sensor 90 is in the same output state irrespective of whether the crankshaft 46 is rotated in a normal direction or a reverse direction, and therefore the ECU 70 and the like cannot detect whether the rotation of the crankshaft 46 is in the normal direction or in the reverse direction.

Based on the data thus obtained, the ECU 70 drives the electric motor 34 to adjust the throttle opening TA, and adjusts the injection timing of the fuel by the fuel injection valve 14. Further, when an automatic stop condition is established, the ECU 70 controls the fuel injection from the fuel injection valve 14 to automatically stop the operation of the engine 2. When an automatic start condition is established, the ECU 70 controls the rotation the crankshaft 46 by the driving force of the motor generator 3 transferred via the pulley 58, the belt 52, the pulley 50 and the electromagnetic clutch 48 to start the engine 2. Further, the ECU 70 executes an ignition timing control, and the other necessary controls.

The motor generator 3 is connected to the crankshaft 46 through the pulley 50, the pulley 58 and the belt 52. One of the crankshaft pulley 50 connected to the crankshaft 46 and the MG pulley 58 connected to the motor generator 3 is rotationally driven, whereby power is transmitted to the other via the belt 52.

The motor generator 3 has the function as the motor (electric motor) rotationally driving by receiving power supply from the power supply unit 5 which will be described later, and has the function as the generator (electric generator) for generating electromotive forces at both ends of a three-phase coil when the motor generator 3 is rotated by receiving the rotational driving force from the wheels 8. When the motor generator 3 functions as the electric motor, the motor generator 3 rotates by receiving the electric power supply from the power supply unit 5, and transmits the rotational driving force to the crankshaft pulley 50 to rotate the crankshaft 46 to start the engine 2. On the other hand, when the motor generator 3 functions as the electric generator, the rotational driving force from the wheels 8 is transmitted to the MG pulley 58 at the side of the motor generator via the crankshaft 46 and the crankshaft pulley 50 to rotate the motor generator 3. When the motor generator 3 is rotated, an electromotive force is generated in the motor generator 3, and the electromotive force is converted into a direct current via the motor control unit 4 to supply electric power to the power supply unit 5. Thus, the power supply unit 5 is charged.

Returning to FIG. 1, a motor angle sensor 3a, in which a Hall element or the like is preferably applied to a detection portion, is provided at a predetermined position in the motor generator 3. The motor angle sensor 3a can detect the rotation angle of the shaft of the motor generator 3 with high resolution of substantially 7.5° CA unit. When the motor generator 3 is rotationally driven by receiving the supply of electric power from the power supply unit 5, the motor angle sensor 3a detects the rotation angle of the shaft. Specifically, the motor angle sensor 3a is provided at each of phases U, V and W so as to be able to detect an alternating current of each of the U, V and W phases. Each of the motor angle sensors 3a detects an alternating current of each of the U, V and W phases and converts it into a pulse signal, and outputs it to the motor control unit 4.

The motor control unit 4 is provided in the engine 2, and connected to the motor generator 3 and the power supply unit 5 by the power supply cable 6, respectively. The motor control unit 4 is mainly constructed by an inverter, a converter, a controlling computer or the like.

The inverter converts a high voltage direct current from the power supply unit 5 into a predetermined three-phase alternating current to supply electric power to the motor generator 3. On the other hand, the inverter converts an electromotive force (three-phase alternating current) generated from the motor generator 3 into a direct current suitable for charging the power supply unit 5.

The converter is a DC/DC converting device for converting a predetermined DC voltage into another predetermined DC voltage. Namely, the converter drops the rated voltage (for example, 36 V voltage) of the power supply unit 5 to a predetermined voltage (for example, 12V voltage) to drive auxiliary machines and the like, or charges a 12V power supply unit loaded on the vehicle.

The controlling computer controls the inverter and the converter. Namely, the controlling computer controls the driving torque and power generation amount of the motor generator 3 in the optimal state, and controls the charge amount to the power supply unit 5 in the optimal state to perform charging. Specifically, when the motor generator 3 functions as the electric motor, the controlling computer controls the driving torque and the power generation amount of the motor generator 3 based on the electric power supplied from the power supply unit 5. As a result, the motor generator 3 is controlled in the optimal state to function as the electric motor. On the other hand, when the motor generator 3 functions as the electric generator, the controlling computer supplies a predetermined direct current to the power supply unit 5 based on the electromotive force generated from the motor generator 3 to charge the power supply unit 5.

The motor control unit 4 counts the number of pulse signals outputted from the aforementioned motor angle sensor 3a, and thereby converts the number into the rotation angle of the shaft of the motor generator 3. The motor control unit 4 converts the converted rotation angle of the shaft into the crank angle based on the rotation ratio of the crankshaft pulley 50 and the MG pulley 58. As a result, the motor control unit 4 can detect the crank angle with high resolution of substantially 3° CA unit.

The motor control unit 4 can detect whether the shaft of the motor generator 3 rotates in the normal or in the reverse direction. Namely, the output state of the pulse signal of each of the phases U, V and W differs when the shaft of the motor generator 3 rotates in the normal direction and in the reverse direction. The pulse signal of each of the phases U, V and W when the shaft of the motor generator 3 rotates in the normal direction is in such an output state according to the phase difference as the pulse signal of the U phase is firstly outputted for a predetermined time, thereafter, the pulse signal of the V phase is outputted for a predetermined time later, thereafter, the pulse signal of the W phase is outputted for a predetermined time later, and they are repeated periodically. In contrast, the pulse signal of each of the phases U, V and W when the shaft of the motor generator 3 rotates in the reverse direction is in such an output state as the pulse signal opposite to that of the normal rotation. Namely, when the shaft of the motor generator 3 rotates in the reverse direction, each of the pulse signals for the predetermined time is periodically repeated in the order of the W phase, V phase and U phase. For this reason, the motor control unit 4 can detect whether the shaft of the motor generator 3 rotates in the normal or the reverse direction, based on the phase difference between them.

The power supply unit 5 is a secondary battery such as a lead battery or a nickel hydrogen battery. The power supply unit 5 is placed at, for example, a rear part of the vehicle 10 to increase space efficiency of the vehicle 10. The power supply unit 5 may have a rated voltage of 36V, for example. The power supply unit 5 has high input-output characteristics at the time of actuation of the motor generator 3 or in energy regeneration during braking the vehicle. Specifically, the power supply unit 5 supplies electric power to the auxiliary machines, the motor generator 3 and the like. Electric power supply to the motor generator 3 is mainly performed while the vehicle 10 is stopped. When the vehicle 10 is running or braking, the electromotive force generated from the motor generator 3 is converted into a direct current via the motor control unit 4 and supplied to the power supply unit 5. As a result, the power supply unit 5 can be charged.

The power supply cable 6 is connected between the motor generator 3 and the motor control unit 4, and also between the motor control unit 4 and the power supply unit 5 as described above, and plays the part of passing the direct current and the three-phase alternating current.

The power transmission system 7 is mainly constructed by the torque converter, a lock-up clutch, a transmission, a power switching mechanism and the like. As a result of their cooperation, the power transmission system 7 transmits or shuts off the rotational driving force generated from the engine 2 or the motor generator 3 to or from the wheels 8 in accordance with the running state. Also, the power transmission system 7 transmits the rotational driving force from the wheels 8 to the motor generator 3 at the time of braking and the like.

The wheel 8 includes tires and the like for transmitting the rotational driving force from the power transmission system 7 to a road surface. In this embodiment, rear wheels are shown as the wheels 8.

Next, examples of the crank angle sensor 90 and the cam angle sensor 92 will be explained.

Figure 3:
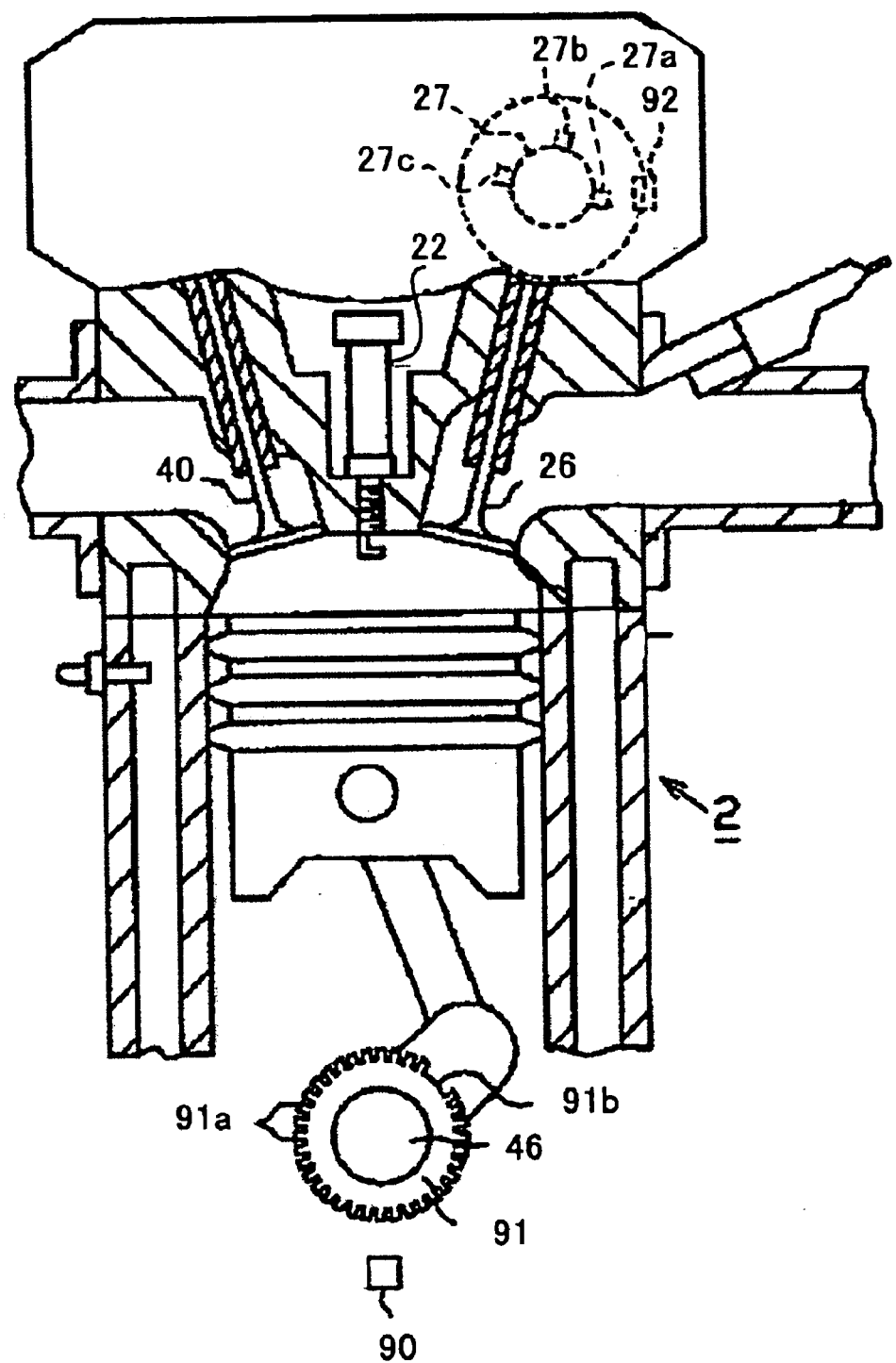
FIG. 3 is a view showing a configuration of a crank angle sensor and a cam angle sensor.

As shown in FIG. 3, a signal rotor 91 (omitted in FIG. 2) is attached to the crankshaft 46. On the outer circumferential portion of the signal rotor 91, 34 teeth (projection portions) 91a formed at equal angles (here, spaced by 10°) with an axis of the crankshaft 46 as a center and a wide lacked tooth (portion with no teeth existing) 91b are provided. The length of the lacked tooth portion 91b corresponds to that of two teeth 91a. The crank angle sensor 90 is provided to oppose the outer circumferential portion of the signal rotor 91. When the crankshaft 46 is rotated, the teeth 91a and the lacked tooth 91b of the signal rotor 91 pass near the crank angle sensor 90 in sequence, whereby a rotation signal of pulse form (hereinafter, called "NE signal") including pulses corresponding to the number of passages of the teeth 91a and the lacked tooth 91b is outputted from the crank angle sensor 90.

On the other hand, three projections 27a, 27b and 27c are provided on the outer circumferential surface of the intake camshaft 27 to be arranged at spaces of 90° (corresponding to 180° CA) with an axis of the intake camshaft 27 as a center. Accordingly, a space between the projection 27a and the projection 27c at both ends is 180° (corresponding to 360° CA). The cam angle sensor 92 for detecting the projections 27a to 27c and outputting the detection signals is provided to oppose these projections 27a to 27c. When the intake camshaft 27 is rotated, the projections 27a to 27c pass near the cam angle sensor 92. As a result, a detection signal in a pulse form is outputted from the cam angle sensor 92 corresponding to each passage of the projections 27a to 27c.

Figure 4A:
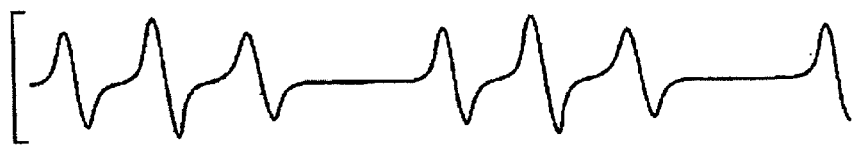
FIGS. 4A to 4D show output signal waveforms of the crank angle sensor and the cam angle sensor.
Figure 4B:
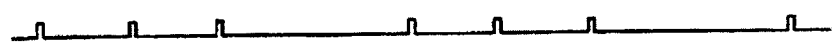
Figure 4C:
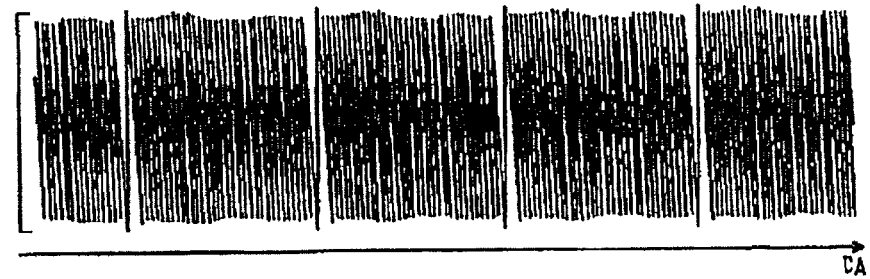
Figure 4D:

Here, the signals obtained from the crank angle sensor 90 and the cam angle sensor 92, which are inputted into the ECU 70 when the engine 2 is driven, are shown in FIGS. 4A, 4B, 4C and 4D. FIG. 4A shows a voltage waveform generated in the cam angle sensor 92 according to the rotation of the intake camshaft 27. FIG. 4B is the waveform obtained by converting the voltage waveform of FIG. 4A into the cam angle signal (G2 signal) in the pulse form. FIG. 4C shows a voltage waveform generated in the crank angle sensor 90 according to the rotation of the crankshaft 46. FIG. 4D is the voltage waveform obtained by converting the waveform of FIG. 4C into the NE signal. In this example, in the NE signal, the number of pulses corresponding to the teeth 91a is 34 per one rotation (360° CA) of the crankshaft 46. Among the rotation signals outputted from the crank angle sensor 90, in the portion corresponding to the lacked tooth 91b, the space between the pulses is made wide due to the absence of 2 pulses. The number of the portions with the wide pulse space is one per one rotation (360° CA) of the crankshaft 46.

The ECU 70 detects rotation phases of the crankshaft 46 and the intake camshaft 27 based on the NE signal from the crank angle sensor 90 and the cam angle signal from the cam angle sensor 92. The ECU 70 performs cylinder discrimination for each cylinder (#1 to #4) based on the rotation phases of the crankshaft 46 and the intake camshaft 27, and selects the cylinder for which the fuel injection and the ignition should be performed from among the cylinders (#1 to #4).

[Operation of Vehicle]

Next, an operation of the vehicle 10 constituted as described above will be explained. The vehicle 10 performs various kinds of operations in accordance with various operation states such as stop, start, normal running, accelerative running, braking or the like.

The engine 2 is in a stopped state during automatic stop (idling stop) of the vehicle 10. When driving of auxiliary machines such as an air compressor, a water pump, a power steering pump or the like is necessary in this state, the motor generator 3 receives the electric power supply from the power supply unit 5 and drives these auxiliary machines without driving the engine 2. However, the engine 2 and the motor generator 3 are rotatably connected with each other via the V belt and the respective pulleys. Therefore, when the shaft of the motor generator 3 is rotated, the rotational driving force is transmitted to the engine 2 in this state. Consequently, in order to drive only the above-described auxiliary machines, the electromagnetic clutch is operated to shut off the rotational driving force from the motor generator 3 so that the crankshaft of the engine 2 is not rotated. This enables to drive only the auxiliary machines without driving the engine 2.

At the time of starting the vehicle 10, namely, when a driver takes his or her foot off the brake pedal while the vehicle is in the idling stop state, the motor generator 3 raises the number of revolution to the vicinity of the number of idling revolution. Then, when the driver stamps or depresses the accelerator pedal, the motor generator 3 rotates the crankshaft of the engine 2 and automatically restarts the engine 2. When a predetermined time elapses from the brake off operation, namely, from the time when the driver takes his or her foot off the brake pedal, the engine 2 may also be automatically restarted to obtain optimal power performance.

At the time of normal running, the vehicle 10 runs by the driving force from the engine 2, which is transmitted to the wheels 8 as in the ordinary vehicles. During normal traveling, if the voltage of the power supply unit 5 is low, the driving force from the wheels 8 is transmitted to the motor generator 3 and the motor generator 3 performs electric power generation. As a result, the motor generator 3 functions as an electric generator, and charges the power supply unit 5 to replenish insufficient electric power of the power supply unit 5 (hereinafter, this operation state will be called "regeneration") Thereby, the power supply unit 5 is always kept in a proper charged state.

When the vehicle 10 performs uphill running and accelerative running, the motor generator 3 is driven by using the electric power of the power supply unit 5 in addition to the state during the aforementioned normal running, in order to provide proper power performance, and the rotational driving force by the motor generator 3 may be given to the rotational driving force of the engine 2 (hereinafter, this operation state will be called "assist"). This allows the vehicle 10 to obtain high power performance with effective use of the two power sources, i.e., the engine 2 and the motor generator 3.

At the time of braking in deceleration and the like, the driving force by the wheels 8 is transmitted to the motor generator 3 via the power transmission system 7 and the engine 2, and the regeneration is performed.

[Engine Stop Control]

Next, an engine stop control of the vehicle 10 will be explained. As described above, the vehicle 10 performs idling stop, namely, automatically stops the engine 2 at the time the vehicle 10 stops. Thereafter, when the driver takes his or her foot off the brake pedal, the motor generator 3 raises its revolution close to the number of idling revolution of the engine 2. Then, when the driver stamps or depresses the accelerator pedal, the motor generator 3 is rotationally driven, and the rotational driving force automatically restarts the engine 2. In this situation, in order to smoothly start running the vehicle 10 at the time of automatic start of the engine 2, the crank angle is controlled to stop at the optimal crank angle stop position inside the engine 2 at the time of idling stop. In the following example, accurate stop control is performed by effectively utilizing inertia energy of the engine 2 at the time of stopping the vehicle.

A method for controlling the crank angle to the optimal crank angle stop position will be described hereinafter. The optimal crank angle stop position is assumed to be a stop position of the crank angle, which makes it easy to get over the top dead center of the compression stroke at the time of restarting the engine 2 in the cylinder at the compression stroke. For example, in the case of the four-cylinder engine as in this example, the crank angle stop position is optimal if it is within a range of the crank angle of 90° CA to 120° CA.

In summary, in the ordinary stop control method of the vehicle 10, the ECU 70 executes fuel cut to the engine 2 at a predetermined timing from the idling state, and automatically stops the engine 2 by the inertia energy which the engine 2 has thereafter. However, the inertia energy which the engine 2 has varies each time according to the number of engine revolution at the time of the fuel cut, and the crank angle stop position differs each time accordingly. For this reason, with the ordinary stop control method of the vehicle 10, it is difficult to control the crank angle to stop at the optimal crank angle stop position, and the next engine start load becomes large depending on the crank angle stop position when the vehicle actually stops. Consequently, in relation with the output torque which the motor generator 3 has, the crankshaft of the engine 2 cannot be rotated, and the probability of failure of automatic restart of the engine 2 becomes high.

Consequently, in this example, the number of engine revolution is kept constant at a predetermined timing after the fuel cut, whereby the inertia energy which the engine 2 has is made constant at that point of time. Thereafter, the inertia energy which the engine 2 has at that point of time is utilized to stop the rotation of the engine 2. By this, the crank angle can be reliably controlled to stop at the optimal crank angle stop position every time.

Especially, in this embodiment, the motor generator 3 is used to make the number of engine revolution constant. Namely, a rotational driving force from the motor generator 3 is given to the crankshaft at a predetermined timing after the fuel cut (hereinafter, called "motoring"), whereby the inertia energy which the engine 2 has is made constant. Thus, the crank angle at the time of stopping the engine is controlled to stop at the optimal crank angle stop position. When the crank angle is at the optimal crank angle stop position, the engine start load at the time of starting the engine can be minimized, and the failure of automatic restart of the engine 2 can be effectively prevented.

The manner of controlling the number of engine revolution at the time of stopping the engine with use of the motor generator 3 is shown in FIG. 5. In FIG. 5, the waveform 100 represents the variation of number of engine revolution according to the engine stop control of this embodiment. The waveform 101 represents a fuel cut signal in the engine stop control, and the fuel cut is executed when the fuel cut signal is at an H-level. The waveform 102 represents a drive signal (MG drive signal) of the motor generator 3, and the motor generator 3 is driven during the period in which the MG drive signal is at the H-level.

If it is assumed that the driver takes his or her foot off the accelerator pedal at time t0, the number of revolution of the engine 2 after time t0 substantially becomes the number of idling revolution NE1. If it is assumed that the driver depresses the brake pedal at time t1, the ECU 70 sets the fuel cut signal to H-level at this point of time, and gives an instruction of the fuel cut. When the fuel cut is executed at time t1, the number of revolution of the engine 2 gradually decreases. When the ECU 70 detects that the number of engine revolution decreases down to a predetermined motor setting number of revolution NE2 (time t2), the ECU 70 sets the MG driving signal to the H-level, drives the motor generator 3, and drives the engine 2 by the motor generator 3.

The motor generator 3 drives the engine 2 at the predetermined motor setting number of revolution NE2 for a predetermined period (time t2 to t3), and when the predetermined period elapses, the ECU 70 stops the motor generator 3 (time t3). When the driving force by the motor generator 3 is removed at time t3, the engine 2 is rotated only by the inertia energy which the engine 2 has at that point of time (i.e., time t3), and therefore the number of engine revolution gradually decreases, and the engine 2 stops in the vicinity of time t4.

In this manner, in the present embodiment, the driving of the engine 2 is temporarily switched to the driving by the motor generator 3 at the time of stopping the engine, and after the engine 2 is kept at the predetermined number of revolution NE2, the driving force of the engine is removed. The inertia energy, which the engine 2 has at the point of time when the driving force is removed, is mainly determined by the number of engine revolution at that point of time. Therefore, by removing the driving force after the number of engine revolution is kept at the predetermined number of engine revolution NE2, the engine 2 has the same inertia energy each time, and stops in the same manner.

Figure 6:
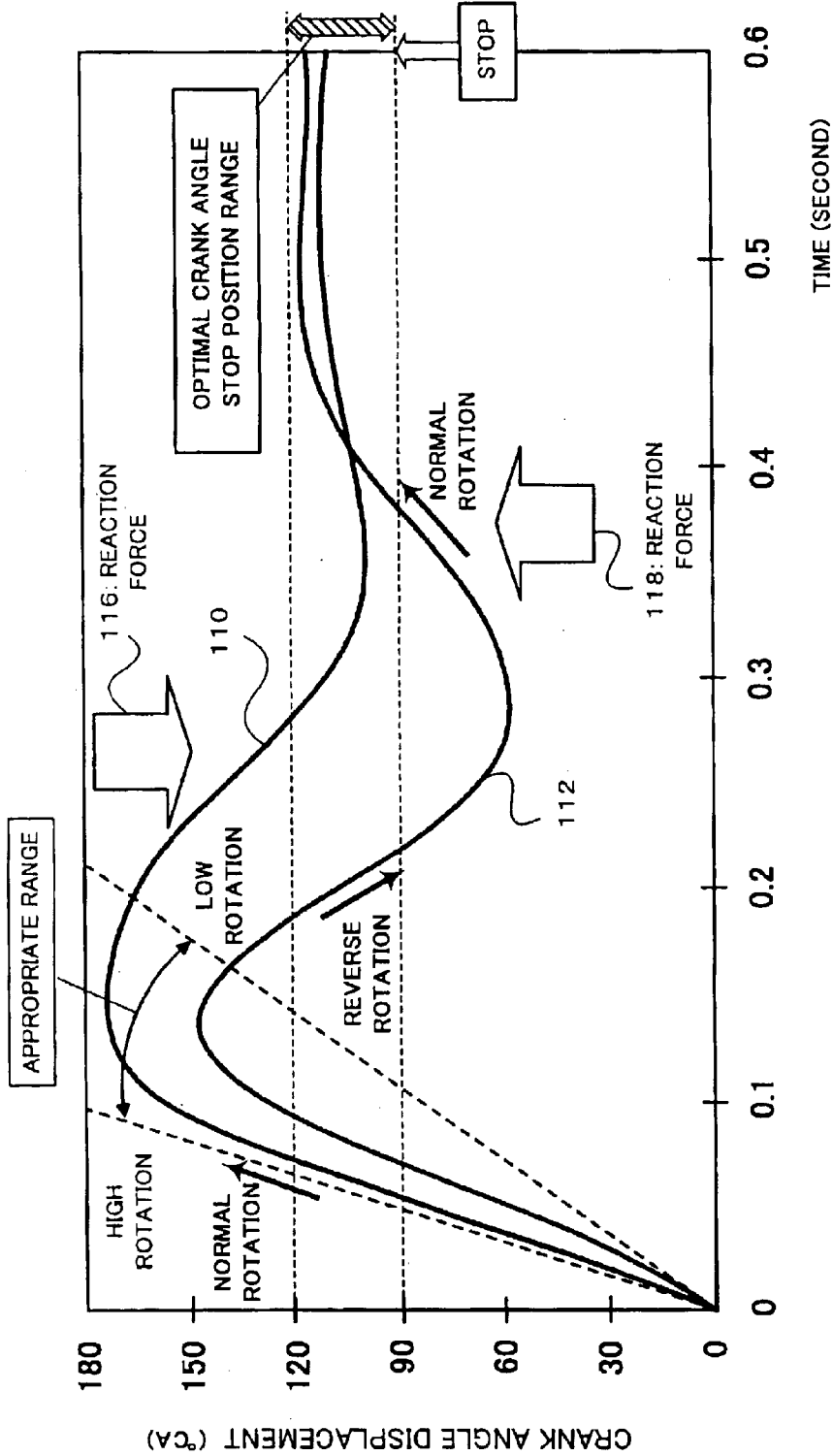
FIG. 6 is a graph showing a change of a crank angle position by the engine stop control.

Next, a behavior of the engine until the engine stops after the driving force is removed at the predetermined number of engine revolution NE2 as described above will be explained. FIG. 6 shows the displacement of the crank angle of the engine 2 after the driving force for the engine 2 is removed. In FIG. 6, the vertical axis shows the displacement of the crank angle (° CA) of a predetermined cylinder. It is noted that the "predetermined cylinder" is the cylinder which is in the compression stroke when the crank angle is displaced from 0° CA to 180° CA, for example, the #3 cylinder. The horizontal axis shows time (second).

Specifically, the vertical axis shows the crank angle displacement (° CA) when the piston corresponding to the predetermined cylinder shifts from the compression stroke to the expansion stroke, and shows the crank angle displacement at every 30° CA from the bottom dead center (0° CA) to the top dead center (180° CA). Meanwhile, the horizontal axis shows the lapse of time (0.6 (second)) from the motoring stopping time (0 (second)) until the crank angle of the predetermined cylinder is controlled to stop at the optimal crank angle stop position at every 0.1 (second).

Next, the graphs in FIG. 6 will be explained. In FIG. 6, two kinds of graphs are shown. They are a graph 110 for the case in which the number of engine revolution at the time of stopping driving (motoring) by the motor generator 3 is high and a graph 112 for the case in which it is low. Namely, during the time from 0 second to 0.1 seconds, the graph 110 with a large gradient shows the crank angle displacement when the number of engine revolution at the time of stopping motoring is high, and the graph 112 with a small gradient shows the crank angle displacement when the number of engine revolution at the time of stopping motoring is low.

First, from 0 second to the vicinity of 0.1 second, it is shown that the piston corresponding to the predetermined cylinder rises from the bottom dead center to the top dead center in the compression stroke. The piston corresponding to the predetermined cylinder rises to the vicinity of the top dead center of the compression stroke just after 0.1 second elapses. At this time, the crankshaft 46 of the engine 2 is rotating in the normal direction.

Thereafter, the piston corresponding to the predetermined cylinder cannot get over the top dead center (180° CA) of the compression stroke, and the crankshaft of the engine 2 is rotated in the reverse direction until it is near 0.3 second. This is for the following reason. As a result that the piston corresponding to the predetermined cylinder approaches the top dead center of the compression stroke, the volumetric capacity in the cylinder gradually becomes smaller, and the pressure becomes higher. In proportion to this, the compression reaction force 116 to push back the piston becomes larger in the cylinder. Accordingly, in the vicinity of the top dead center of the compression stroke, the compression reaction force is the largest in the cylinder, and therefore the inertia energy which the engine has at that point of time cannot beat the compression reaction force. Thus, the piston corresponding to the predetermined cylinder is pushed back to the side of the bottom dead center of the compression stroke. Thus, the piston corresponding to the predetermined cylinder cannot get over the top dead center of the compression stroke, and the crankshaft of the engine 2 is rotated in the reverse direction.

Thereafter, the piston corresponding to the predetermined cylinder moves to the bottom dead center of the compression stroke, and the crankshaft 46 of the engine 2 is rotated in reverse again in the vicinity of 0.3 second. Namely, the crankshaft of the engine 2 is rotated in the normal direction. This is for the following reason. Namely, at this time, the piston corresponding to the predetermined cylinder firstly descends to the bottom dead center of the compression stroke. In the compression stroke, the intake and exhaust valves are both in the closed state, and therefore the volumetric capacity inside the cylinder becomes gradually larger as the piton descends to the bottom dead center of the compression stroke. Consequently, negative pressure is formed inside the cylinder, and the negative pressure becomes gradually larger. Accordingly, the piston corresponding to the predetermined cylinder is returned in the direction of the top dead center again by a reaction force 118 caused by the negative pressure. As a result, the crankshaft of the engine 2 is rotated in the normal direction again.

Thereafter, the inertia energy which the engine 2 has gradually decreases from the vicinity of 0.3 second, and the engine 2 stops after 0.6 second elapses. As a result, the crank angle stop position converges within a range of the crank angle of 90° CA to 120° CA. If the crank angle stop position ultimately converges within the range of the crank angle of about 90° CA to 120° CA, it is considered that the crank angle is controlled to stop at the optimal crank angle stop position, and the stop control is successful.

According to the aforementioned engine stop control, it is possible to estimate, before the engine actually stops, at which stroke each cylinder stops at the time of engine stop. As shown in FIG. 5, in the above-described engine stop control, a predetermined motoring period is provided after the fuel cut to keep the number of revolution of the engine 2 at a predetermined number of revolution, whereby the inertia energy which the engine 2 has is made constant at that point of time, and thereafter the motoring is finished to remove the driving force of the engine 2 to stop the engine 2. Consequently, how many times the engine 2 rotates until it stops after the motoring is finished depends on the inertia energy which the engine 2 has when the motoring is finished, i.e., the number of engine revolution kept by the motoring, the motoring period and the like. Conversely, since the number of revolution during the motoring is kept constant, how many times the engine rotates before the engine (i.e., crankshaft) stops after the motoring is finished always becomes constant.

Consequently, if it is detected to which stroke each of the cylinders belongs at the time of starting the motoring by the cylinder discrimination utilizing the aforementioned cam angle sensor 92 and the like, it can be estimated in which stroke each of the cylinder is when the engine finally stops after the motoring is carried out for a predetermined motoring period. For example, if the inertia energy at the time of finishing the motoring, i.e., the number of engine revolution at the time of finishing the motoring is determined so that, for example, a certain cylinder at a specific stroke at the time of finishing the motoring can get over the next compression top dead center, but cannot get over the second compression top dead center, the cylinder is in the compression stroke when the engine 2 stops. It is known, from the motoring period, how many times the engine 2 rotates during the motoring period. Consequently, the ECU 70 can estimate, during execution of the engine stop control, which stroke each of the cylinders are in, at the time of engine stop, based on the information of the stroke of each of the cylinders at the time of the motoring stop or at the time of the motoring start, and the information indicating how many times the engine 2 rotates by the inertia energy after the motoring is finished. In the stop and start control of the engine 2 of the present invention which will be described hereinafter, an air-fuel mixture is introduced and sealed in the cylinder, which is estimated to be in a specific stroke after the engine stop, before the engine stop by utilizing the estimation result.

[Stop and Start Control]

Next, the stop and start control of the engine for early ignition start according to the present invention will be described.

(First Method)

A first method is to perform early start of the engine 2 by previously performing fuel injection to a cylinder which is estimated to stop in the compression stroke at the time of engine stop to seal the mixture in the combustion chamber, when carrying out the engine stop control at the aforementioned optimal crank angle stop position, and by igniting the mixture in addition to the cranking by the motor generator, at the time of engine start.

First, a basic principal of the first method will be explained. In the first method, for example, at the time of engine stop such as the idling stop, the aforementioned engine stop control is performed and it is estimated which stroke each of the cylinder is in at the time of engine stop. Thus, the cylinder that is estimated to be in the compression stroke when the engine stops is specified. It can be estimated, by the aforementioned method, which stroke each of the cylinders are in at the time of engine stop.

In a port injection type engine as in the first method, since both the intake and the exhaust valves are normally in the closed state in the cylinder in the compression stroke during engine stop, the mixture cannot be introduced to the combustion chamber of the cylinder after the engine stops, unlike a so-called direct injection type engine. For this reason, in order to introduce and seal the mixture in the combustion chamber of the cylinder estimated to be in the compression stroke at the time of engine stop (hereinafter, also called "stop time compression stroke cylinder"), it is necessary to perform fuel injection in advance at the intake stroke of the cylinder. Consequently, when, for example, #3 cylinder is estimated to be in the compression stroke at the time of engine stop, the ECU 70 performs the fuel injection for the cylinder in the intake stroke preceding the compression stroke, and seals the mixture in the combustion chamber in advance. At the point of time when this fuel injection is performed, the engine is not stopped yet, and the inside of the combustion chamber of the cylinder in the intake stroke is under negative pressure. Therefore, the mixture containing fuel injected in the intake port can be reliably introduced into the combustion chamber. As a result, the engine stop control is completed, and when the engine stops, the mixture is sealed inside of the combustion chamber of the stop time compression stroke cylinder (#3 cylinder in this example).

At the time of engine start, the ECU 70 performs cranking by the motor generator 3, and ignites the stop time compression stroke cylinder (#3 cylinder) to generate explosion energy to rotate the crankshaft, whereby the early start of the engine 2 can be performed.

The mixture which is thus sealed in the stop time compression stroke cylinder at the time of engine stop has a favorable air-fuel ratio based on the A/F sensor output during engine stop control, i.e., before the engine stop. Also, as described in the explanation of the aforementioned engine stop control, since the rotation of the engine is reversed immediately before the engine is stopped by utilizing the inertia energy, the sealed mixture is subjected to the repeated compression and expansion by the piston in the combustion chamber, and is in a state in which air and fuel are mixed well. Further, the engine is still in a warmed-up state after the engine stops, and therefore the mixture generates convection inside the combustion chamber by receiving heat from the cylinder, which promotes mixing of the air and the fuel. For these reasons, the atomized homogenous mixture is kept in the combustion chamber, and the mixture is in an easily ignitable state. Consequently, the mixture is combusted smoothly by the ignition at the time of the engine start, and the early start of the engine can be achieved.

Next, the first method will be explained with reference to FIG. 7 and FIG. 8.

Figure 7:
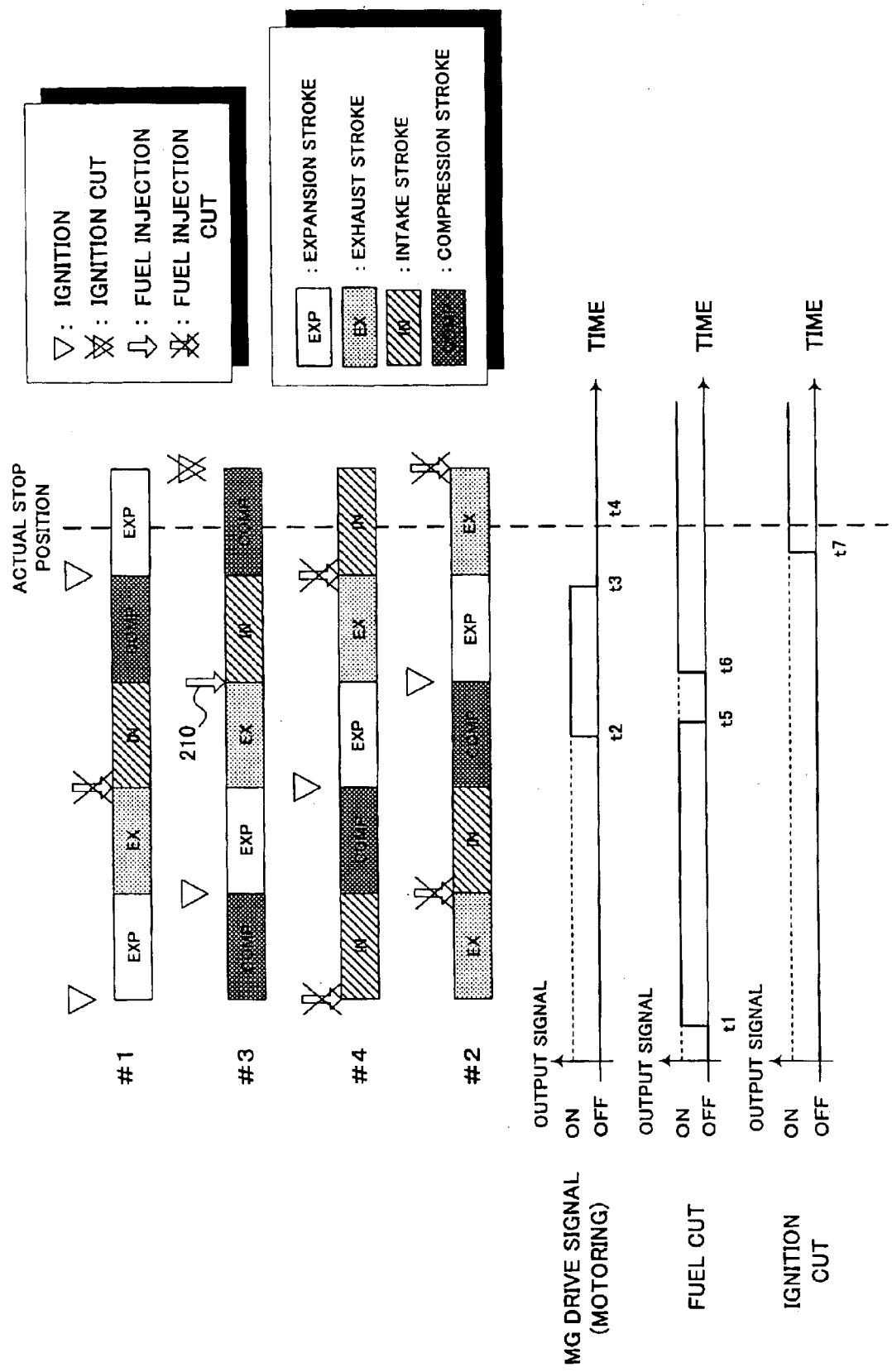
FIG. 7 shows an engine stop control example according to a first method.

FIG. 7 is a stroke chart showing a state of each of the cylinders just before the engine stops, and a time chart corresponding to the stroke chart. In FIG. 7, the stop time compression stroke cylinder is assumed to be the #3 cylinder. In the first method, an example of a four-cylinder engine is described, but the application of the present invention is not limited to this. The firing order of the engine 2 is, for example, #1 cylinder-#3 cylinder-#4 cylinder-#2 cylinder, but the application of the present invention is not limited to this.

The engine stop control here is basically the same as what is explained above with reference to FIG. 5 and FIG. 6. Namely, after the driver releases the accelerator, the fuel cut signal is turned on at the time of braking (time t1), and the fuel cut is performed. As a result, the fuel injection is not performed after the time t1 as a rule. Thereafter, when the number of engine revolution goes down to a predetermined number, the MG drive signal is turned on at time t2, and the motoring is started. After a predetermined time elapses, the motoring finishes at time t3, and thereafter the engine shows the behavior shown in FIG. 6 and stops at time t4. The position at which the engine stops is shown by the broken line as an actual stop position in FIG. 7.

In the engine stop state, the #3 cylinder which is the stop time compression stroke cylinder is in the compression stroke. The ECU 70 already estimates this during engine stop control, for example, at the time of starting the motoring. The ECU 70 performs fuel injection to the #3 cylinder, which is the stop time compression stroke cylinder, in the intake stroke just before the engine stop (see the arrow 210). Namely, as known with reference to the fuel cut signal, though the fuel injection is not performed after the level change of the fuel cut signal as a rule, the fuel cut is temporarily intermitted and the fuel is exceptionally injected (time t5 to t6) only while the stop time compression stroke cylinder belongs to the intake stroke just before the engine stop in order to introduce and seal the mixture in the stop time compression stroke cylinder. As a result, the mixture is sealed in the #3 cylinder which is in the compression stroke at the time of engine stop. In the vicinity of the engine stop at the time t4, the ECU 70 turns on the ignition cut signal, and stops the ignition in all the cylinders.

Next, the start control performed after the engine stops in that way will be explained with reference to FIG. 8. FIG. 8 is a stroke chart showing an example of the start control of the engine 2 after the engine stop control. The actual stop position shown in FIG. 8 is the same as the actual stop position shown in FIG. 7.

Figure 8:
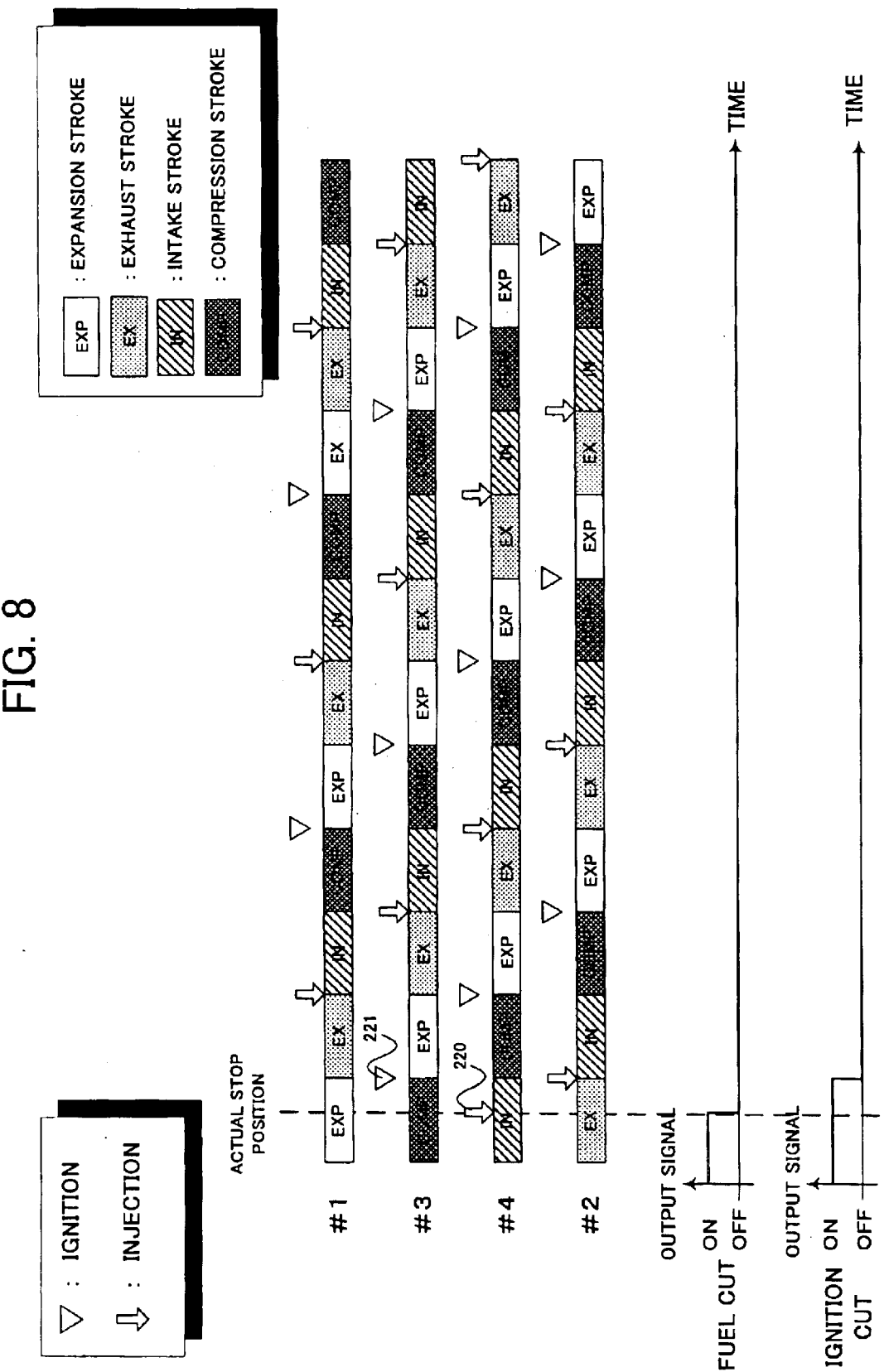
FIG. 8 shows an engine start control example after the stop control according to the first method.

As shown in FIG. 8, the #4 cylinder is in the intake stroke at the actual stop position. Consequently, in order to carry out early start of the engine 2, the ECU 70 turns off the fuel cut signal when the engine start condition is established, and executes fuel injection through the EFI into the combustion chamber of the #4 cylinder in the intake stroke (see the arrow 220).

In the actual stop position, the #3 cylinder is in the compression stroke as mentioned above, and the mixture is sealed in the combustion chamber of the #3 cylinder. Consequently, the ECU 70 ignites the mixture sealed in the combustion chamber of the #3 cylinder to rotate the crankshaft (see the arrow 221). Specifically, the ECU 70 shifts the ignition cut signal from on to off when the engine starting condition is established, and transmits the ignition command signal to the igniter when the #3 cylinder reaches the compression top dead center. By this, the ECU 70 rotates the crankshaft by the combustion pressure generated at that time. Thereafter, the fuel injection and ignition are executed as usual.

As described above, according to the first method, at the time of the engine start, the mixture sealed in the stop time compression stroke cylinder at the time of engine stop is combusted to generate explosion energy to drive the crankshaft, in addition to the cranking by the motor generator. Thus, early initial explosion of the engine 2 is realized, and the engine can be started quickly.

(Second Method)

The second method is intended to realize early ignition start of the engine 2 more quickly, by utilizing the engine stop and start control according to the aforementioned first method as a base. Specifically, in the second method, the fuel injection is performed, in advance, for the cylinder estimated to stop in the expansion stroke at the time of engine stop (hereinafter, also called "stop time expansion stroke cylinder") thereby to seal the mixture at the time of engine stop. At the time of the engine start, normal pressure ignition is performed for the mixture, whereby earlier start of the engine is performed. Here, the normal pressure ignition means that the ECU 70 ignites not the mixture in the compressed state by the normal compression stroke, but to the mixture in the combustion chamber in the expansion stroke near the atmospheric state through the EFI.

Explaining the outline of the second method, first, during the engine stop control, the stop time compression stroke cylinder and the stop time expansion stroke cylinder are estimated. When it is estimated that the #1 cylinder is in the expansion stroke and the #3 cylinder is in the compression stroke during the engine stop, for example, the ECU 70 performs the fuel injection to these cylinders, respectively, in the intake stroke just before the engine stop, and the mixture is sealed in each of the combustion chamber.

Consequently, when the engine stops after the engine stop control is completed, the mixture is sealed and retained in the combustion chamber of each of the cylinder. In addition, the mixture becomes favorably atomized mixture by the reverse movement of the engine at the time of the engine stop, the convention effect by heat received from the cylinder and the like, and is in an easily ignitable state.

Consequently, when the engine start condition is established thereafter, the ECU 70 first drives the motor generator 3 to perform cranking, and starts to ignite the stop time compression stroke cylinder and the stop time expansion stroke cylinder. This enables to start the engine 2 by utilizing the explosion energy of the stop time expansion stroke cylinder in addition to the driving energy of the motor generator and the explosion energy of the stop time compression stroke cylinder, and hence the start of the engine 2 can be more quick and reliable.

Figure 9:
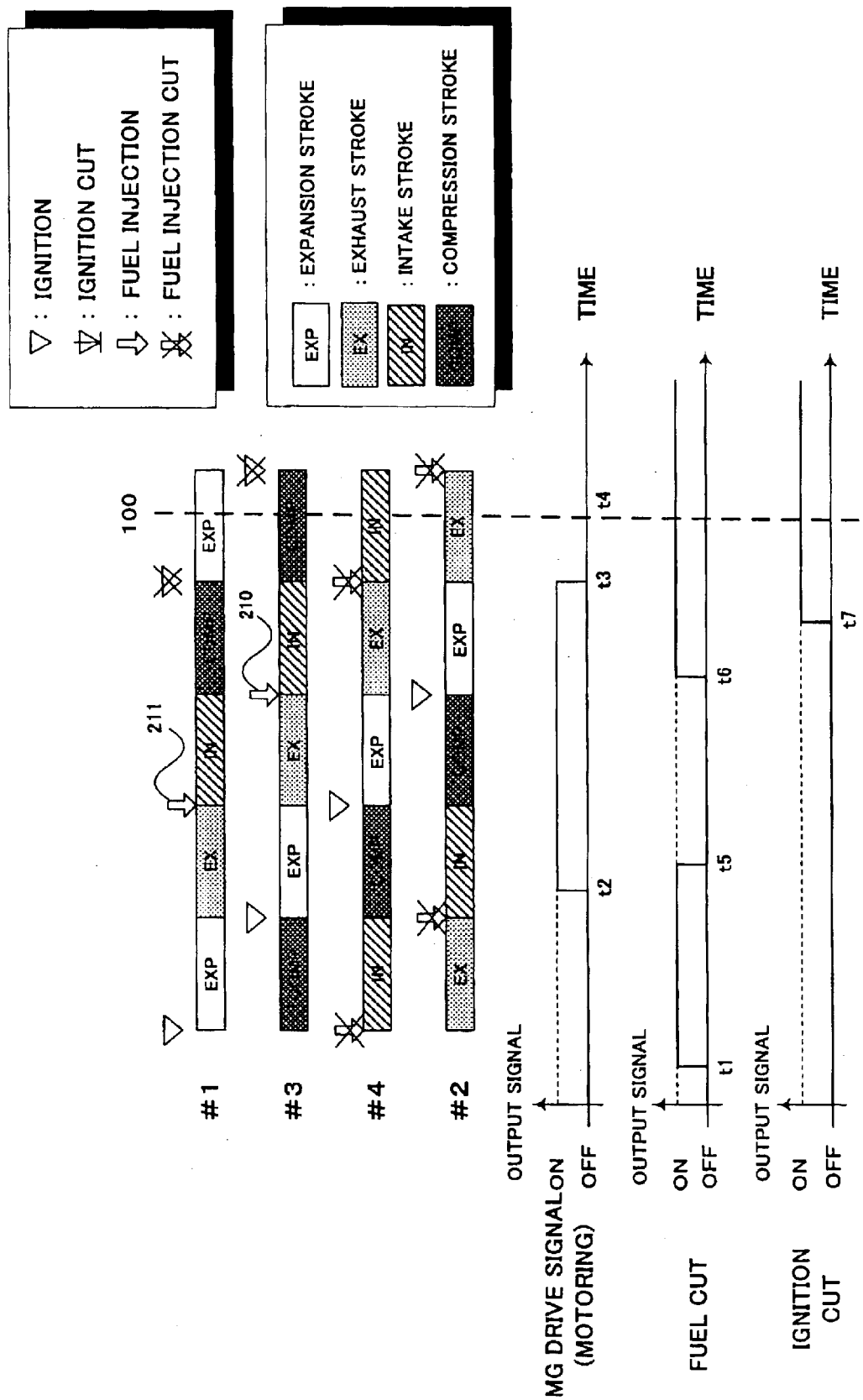
FIG. 9 shows an engine stop control example according to a second method and a method of a discharge prevention control of an unburned fuel according to a first example.

Next, an example of the engine stop control in the second method will be explained with reference to FIG. 9. As shown in FIG. 9, the engine stop control of the second method is different from the engine stop control (see FIG. 7) according to the first method in that the fuel injection is also performed for the #1 cylinder, which is the stop time expansion stroke cylinder, after the fuel cut is executed at the time t1. Namely, in the engine stop control, the fuel cut is executed at the time t1, and the motoring by the motor generator is started when the number of engine revolution goes down to a predetermined number at the time t2. Thereafter, the fuel cut is temporarily intermitted at the time t5 when the #1 cylinder which is the stop time expansion stroke cylinder is in the intake stroke just before the engine stop, and the fuel injection is performed for the #1 cylinder (arrow 211). Subsequently, the fuel injection is also performed for the #3 cylinder which is the stop time compression stroke cylinder (arrow 210), in the similar manner as the first method. When the fuel injection to these two cylinders is completed, the fuel cut is carried out again at the time t6. The motoring is finished at the time t3, and the engine stops at the time t4.

Figure 10:
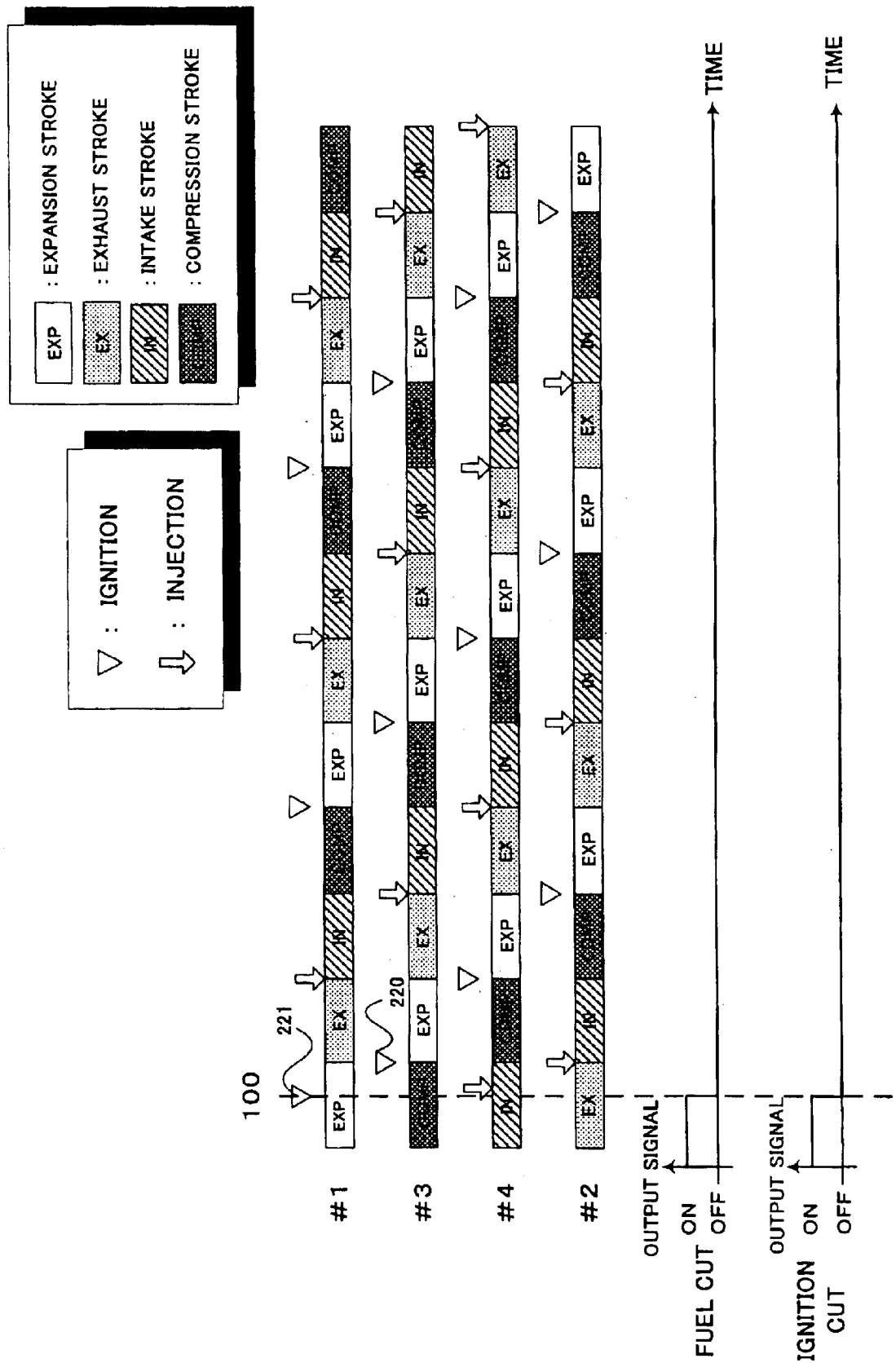
FIG. 10 shows an engine start control example after the stop control according to the second method.

Next, an example of the engine start control in the second method will be explained with reference to FIG. 10. In FIG. 10, when the engine start condition is established, the fuel cut signal is turned off to start the fuel injection, and the ignition cut signal is turned off to carry out the ignition. Since the mixture is sealed in the #3 cylinder which is the stop time compression stroke cylinder and the #1 cylinder which is the stop time expansion stroke cylinder during engine stop shown at the actual stop position 100 in FIG. 10, the #1 cylinder is ignited (arrow 221) and the #3 cylinder is ignited (arrow 220) at the time of engine start, and the driving force by the explosion energy is generated. The explosion energy is added to the cranking by the motor generator, and therefore early start of the engine can be achieved.

[Discharge Prevention Control of Unburned Fuel]

Next, the discharge prevention control of unburned fuel according to this embodiment will be explained.

First, the outline is explained. In the aforementioned engine stop control, the fuel injection is previously performed for each of the combustion chambers of the #1 cylinder which is the stop time expansion stroke cylinder and the #3 cylinder which is the stop time compression stroke cylinder, and at the time of the engine start, the ignition is executed for each of the cylinders, whereby early ignition start of the engine is performed. Since the crank angle position is at the optimal crank angle stop position, i.e., at the stop position at which the #3 cylinder easily get over the compression top dead center at the time of engine stop, the required energy at the time of engine start can be minimized, and the start of the engine 2 is facilitated. As a result, the engine can be started quickly and reliably.

However, when the driver turns off the ignition switch 72 during the idling stop, the engine start at next time needs to be performed by the DC starter 1. Therefore, at the time of engine start, the driver turns on the ignition switch 72, whereby the cranking is executed by the DC starter 1. As a result, the crank shaft 46 is rotated, the #3 cylinder which is in the compression stroke during the engine stop time is shifted to the expansion stroke, while the #1 cylinder which is in the expansion stroke during the engine stop time is shifted to the exhaust stroke. Consequently, the mixture (including unburned fuel) sealed in the combustion chamber of each of the cylinders is discharged through the exhaust port 38 to cause deterioration of emission.

In this view, in this embodiment, the above-described problem is solved by each example described below. In each example shown below, as the engine stop positions, the stop time compression stroke cylinder is assumed to be the #3 cylinder, and the stop time expansion stroke cylinder is the #1 cylinder.

FIRST EXAMPLE

In the first example, when the ignition switch 72 is turned off when the engine stops in the idling stop state, i.e., in the state that the mixture containing unburned fuel is sealed in each of the combustion chambers of the #1 cylinder which is the stop time expansion stroke cylinder and the #3 cylinder which is the stop time compression stroke cylinder, the unburned fuel is combusted so as not to be discharged from the exhaust port 38.

Figure 11:
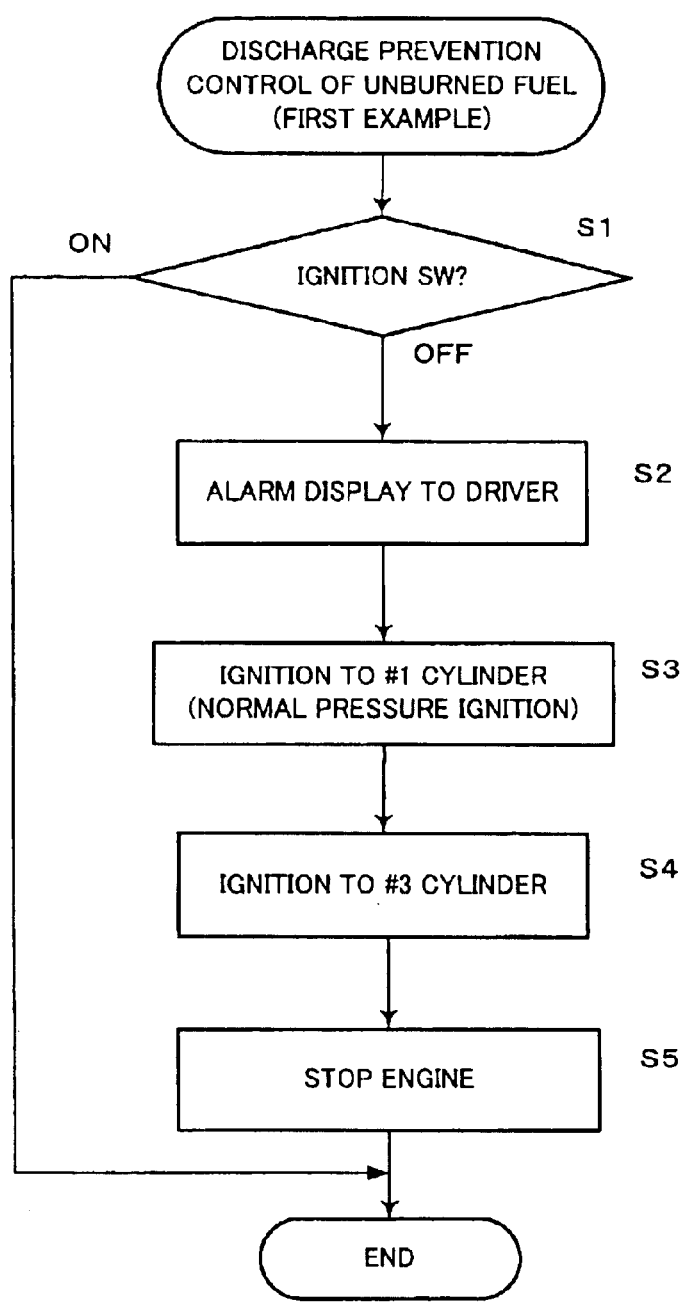
FIG. 11 shows a flow chart of the discharge prevention control of the unburned fuel according to the first example.

The first example will be explained with reference to FIG. 9 and FIG. 11. FIG. 11 shows a flow chart of the first example. This control is basically executed by the ECU 70 based on output signals from various kinds of sensors. In this example, the explanation is made based on the aforementioned stop and start control (second method). At the actual stop position 100 shown in FIG. 9, the #1 cylinder is in the expansion stroke and the #3 cylinder is in the compression stroke. It is assumed that the ignition switch 72 is turned off when the engine stops at this actual stop position 100.

First, in step S1, the ECU 70 determines whether the output signal of the ignition switch 72 is on or off. When the output signal of the ignition switch 72 is on, it indicates the normal idling stop state, and therefore the ECU 70 finishes the processing. Namely, when the output signal of the ignition switch 72 is on, the idling stop state is kept. Thereafter, when the driver takes his or her foot off the brake pedal, the engine 2 is automatically restarted. On this occasion, by igniting the fuel sealed in the stop time expansion stroke cylinder and the stop time compression stroke cylinder, the cranking is performed, as described above.

On the other hand, when the output signal of the ignition switch 72 is off, the process goes to step S2. In step S2, an alarm is displayed on an operation panel or the like, first. The alarm is displayed to notify the user that that the unburned fuel is sealed in the #1 cylinder in the expansion stroke and the #3 cylinder in the compression stroke, respectively, and that a special processing is performed to burn the unburned fuel by temporarily starting the engine 2 in order to prevent this unburned fuel from being discharged through the exhaust port. The alarm is designed to be easily recognized by the driver at a glance, and the ECU 70 displays it on the operation panel and the like. Consequently, even when the engine 2 temporarily starts after the driver turns off the ignition switch 72, the driver recognizes that this is not because of the abnormality of the engine, but the above-described special processing is executed.

Subsequently, in step S3, in order to prevent the discharge of the unburned fuel inside the #1 cylinder in the expansion stroke, the ECU 70 executes the ignition (normal pressure ignition) by operating the igniter. Thus, the unburned fuel in the #1 cylinder is combusted. Subsequently, in step S4, in order to prevent the discharge of the unburned fuel in the above-described #3 cylinder, the ECU 70 executes ignition by operating the igniter. By the ignition in steps S3 and S4, the explosion energy is generated, and the engine 2 is temporarily started. After the unburned fuel is thus combusted by performing ignition inside the #1 cylinder and the #3 cylinder, the ECU 70 stops the engine 2 in step S5.

As described above, in this example, when the driver turns off the ignition switch 72 in the state that the engine is stopped by the idling stop, the ignition is performed for the stop time compression stroke cylinder and the stop time expansion stroke cylinder, in which the unburned fuel is previously sealed, to forcibly combust the unburned fuel. While the engine is temporarily started by this combustion, it is stopped immediately after that. This makes it possible to prevent the unburned fuel sealed in the stop time compression stroke cylinder and the stop time expansion stroke cylinder from being discharged as it is at the time of the next start of the engine.

When the aforementioned engine stop control is not performed at the engine stop in step S5, the crank angle stop position becomes unclear, and there is possibility that the start torque required to start engine increases at the time of the engine start. However, since the next engine start is performed by the DC starter 1 with large output torque, there arises no special problem about starting performance of the engine 2.

Application Example of the First Example

Next, an application example of the first example will be explained. The application example of the first example is a control to suppress the vibration, occurring when the unburned fuel is combusted in the first example, by using the motor generator 3 so that the drives feels less uncomfortable feeling.

In the above-described first example, the engine is temporarily started by igniting and exploding the unburned fuel sealed in each of the combustion chambers of the #3 cylinder which is the stop time compression stroke cylinder and the #1 cylinder which is the stop time expansion stroke cylinder, and the unburned fuel is prevented from being discharged to the atmosphere through the exhaust port 38. However, a vibration may occur to the vehicle 10 due to the explosion energy, and when it is large, it gives uncomfortable feeling to the driver.

Therefore, in order to suppress the vibration, in this example, the rotation driving force from the motor generator 3 is given in the counter direction to the rotation direction of the crankshaft 46 rotating by receiving the explosion energy. By this, the vibration occurring by the combustion of the unburned fuel is cancelled off so that the vibration is suppressed. Namely, even when the ignition is performed in each of the cylinder in which the unburned fuel is sealed, the unburned fuel can be combusted without substantially rotating the crankshaft 46, and therefore the vibration can be effectively suppressed.

Figure 12:
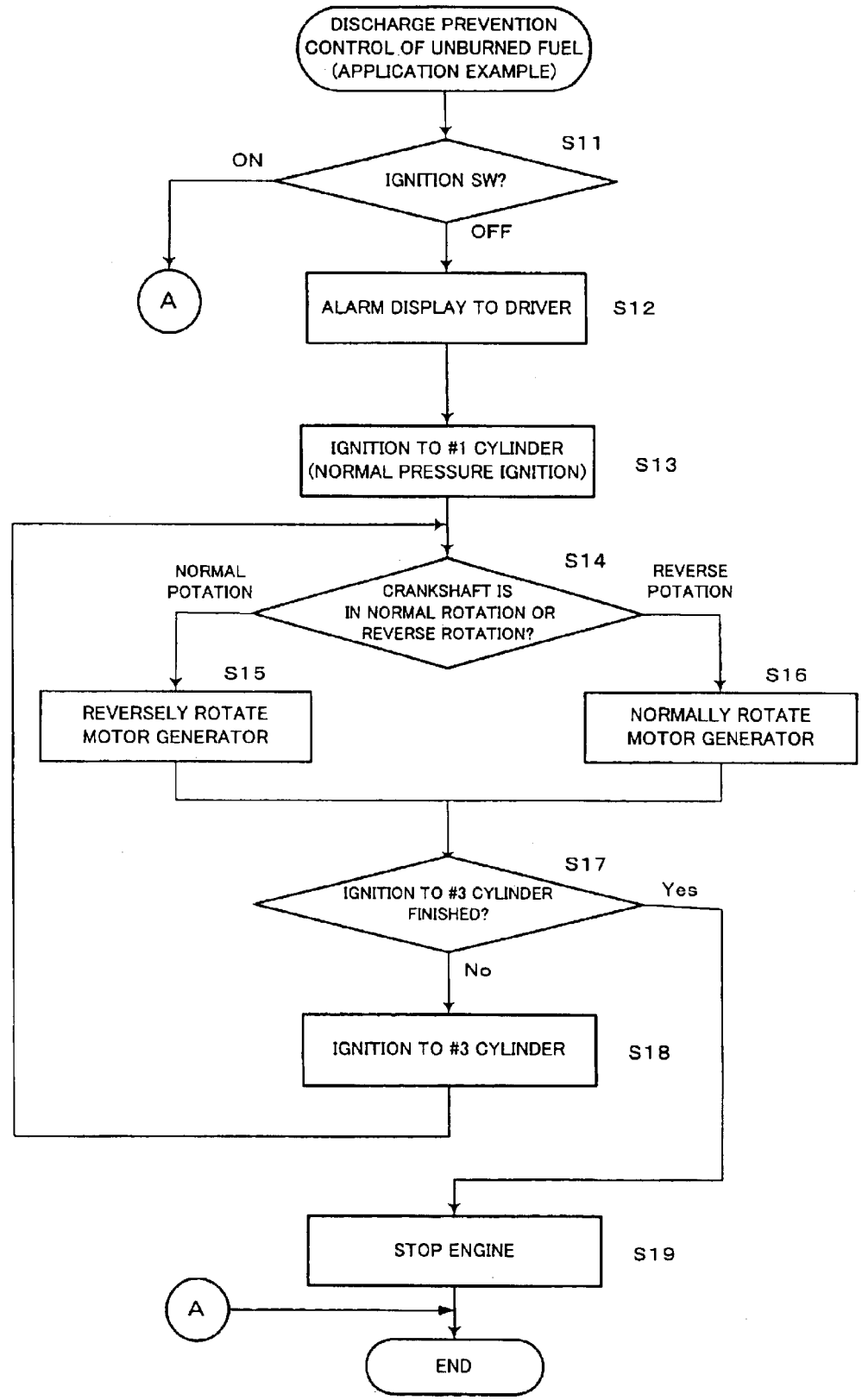
FIG. 12 is a flow chart of the discharge prevention control of the unburned fuel according to an application example of the first example.

Next, the discharge prevention control of the unburned fuel according to this application example will be explained with reference to a flow chart shown in FIG. 12. This processing is basically executed by the ECU 70 based on the output signals from the various kinds of sensors.

Explaining in order, the explanation from steps S11 to S13 will be omitted since they are the same as steps S1 to S3 of the flow chart (see FIG. 11) of the first example.

Subsequently, in step S14, the ECU 70 determines whether the rotation direction of the crankshaft 46 rotated by receiving the explosion energy by the normal pressure ignition in the #1 cylinder is the normal rotation direction or the reverse rotation direction. When the crankshaft 46 rotates in the normal direction, the ECU 70 controls the motor generator 3 to rotate in the reverse direction, which is counter to the rotation direction (i.e., normal rotation) of the crankshaft 46 via the motor control unit 4 (step S15). On the other hand, when the crankshaft 46 rotates in the reverse direction, the ECU 70 controls the motor generator 3 to rotate in the normal rotation direction, which is counter to the rotation the rotation direction (i.e., reverse rotation) of the crankshaft 46 via the motor control unit 4 (step S16). As a result, the explosion energy occurring due to the combustion of the unburned fuel is cancelled off by the driving force of the motor generator, and thus the vibration can be suppressed.

When the engine is at the optimal crank angle stop position at the time of stop and the normal pressure ignition is performed for the #1 cylinder which is the stop time expansion stroke cylinder, it is considered that the crankshaft 46 basically rotates in the normal rotation direction. Consequently, the rotational driving force to be applied from the motor generator 3 is in the counter direction (i.e., reverse rotation direction) to the rotation direction (i.e., normal rotation direction) of the crankshaft 46.

Subsequently, in step S17, the ECU 70 determines whether the ignition to the #3 cylinder is finished or not. When the ignition to the #3 cylinder is finished (step S17; Yes), the process goes to step S19, and the engine 2 is stopped. On the other hand, when the ignition to the #3 cylinder is not finished yet (step S17; No), the process goes to step S18, and the ignition to the #3 cylinder is executed.

It is preferable to perform the ignition at this time just before the piston of the #3 cylinder reaches the compression stroke top dead center in order to make the vibration occurring due to the explosion energy as small as possible. Specifically, at the time of engine stop, the #3 cylinder is at the optimal crank angle position (for example, about 90° to 120° CA). Thereafter, the crankshaft 46 starts to rotate by the normal ignition in the #1 cylinder, and the piston in the #3 cylinder approaches the compression stoke top dead center (180°) to compress the mixture including the unburned fuel inside the combustion chamber. The ECU 70 executes the ignition before the piston reaches the compression stroke top dead center. As a result, as compared with the case in which the unburned fuel is combusted after the piston reaches the compression top dead center, the explosion energy can be reduced. Consequently, the vibration occurring due to the explosion energy can be reduced, and the uncomfortable feeling given to the driver can be minimized.

The ignition to the #3 cylinder is performed before the piston in the #3 cylinder reaches the compression stroke top dead center, and in accordance with the timing of the ignition at this time, the crankshaft 46 may rotates in the normal direction or in the reverse direction. Therefore, if the ignition to the #3 cylinder is executed, the process returns to step S14, and the ECU 70 determines whether the crankshaft 46 is rotating in the normal direction or in the reverse direction by receiving the explosion energy by the ignition in the #3 cylinder.

When the crankshaft 46 is rotating in the normal direction, the ECU 70 makes the motor generator 3 rotate in the counter direction (i.e., reverse rotation) to the rotation direction (i.e., normal rotation) of the crankshaft 46 via the motor control unit 4 (step S15). On the other hand, when the crankshaft 46 is rotating in the reverse direction, the ECU 70 makes the motor generator 3 rotate in the counter direction (i.e., normal rotation) to the rotation direction (i.e., reverse rotation) of the crankshaft 46 via the motor control unit 4 (step S16). In practice, the rotation direction of the crankshaft 46 is determined by the balance between the force of the explosion energy occurring as a result of the ignition to the #3 cylinder and the inertia energy which the engine 2 has. The ECU 70 can determine whether the crankshaft rotates in the normal direction or in the reverse direction by monitoring the displacement and the like of the crank angle after the ignition to the #1 cylinder and the #3 cylinder.

Thus, when the determination in step S17 results in Yes, the ECU 70 goes to step S19 and stops the engine 2.

As explained above, according to this application example, when the unburned fuel sealed in the stop time compression stroke cylinder and the stop time expansion stroke cylinder is compulsorily combusted, the driving force is given by the motor generator in the counter direction to the direction in which the crankshaft is rotated by the combustion, and therefore the vibration of the vehicle can be suppressed.

As described above, when the unburned fuel sealed in the stop time expansion stroke cylinder is compulsorily combusted as described above, only the technique of reducing the explosion energy by performing the ignition prior to the compression top dead center of the cylinder can be applied to the first example. Namely, even when the driving force counter to the explosion energy is not given by the motor generator like in this application example, it is effective to reduce the explosion energy by performing the ignition prior to the compression top dead center in the viewpoint of prevention of vibration.

SECOND EXAMPLE

In the second example, after the unburned fuel is introduced and sealed in each of the combustion chambers of the #1 cylinder which is the stop time expansion stroke cylinder and the #3 cylinder which is the stop time compression stroke cylinder, if it is determined that the engine stop control to the aforesaid each stop control position is impossible, the exhaust valve of each of the cylinders are closed at predetermined timings to prevent the unburned fuel being discharged from the exhaust port 38. Thus, deterioration of the emission is avoided. This example is based on the premise that the engine employs the function of controlling opening and closing of the exhaust valve at an arbitrary timing.

Figure 13:
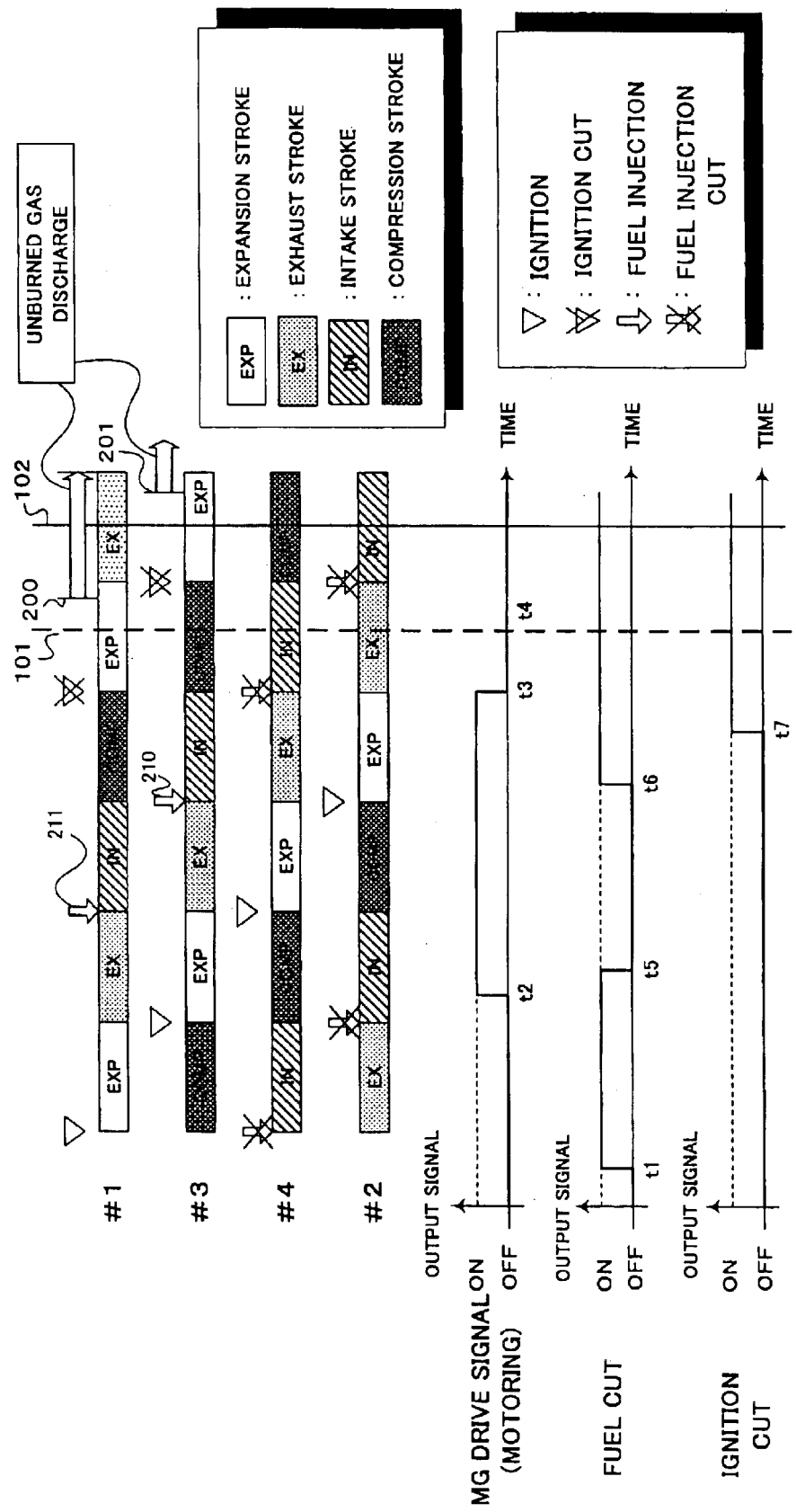
FIG. 13 shows a method of a discharge prevention control of an unburned fuel according to the second example.
Figure 14:
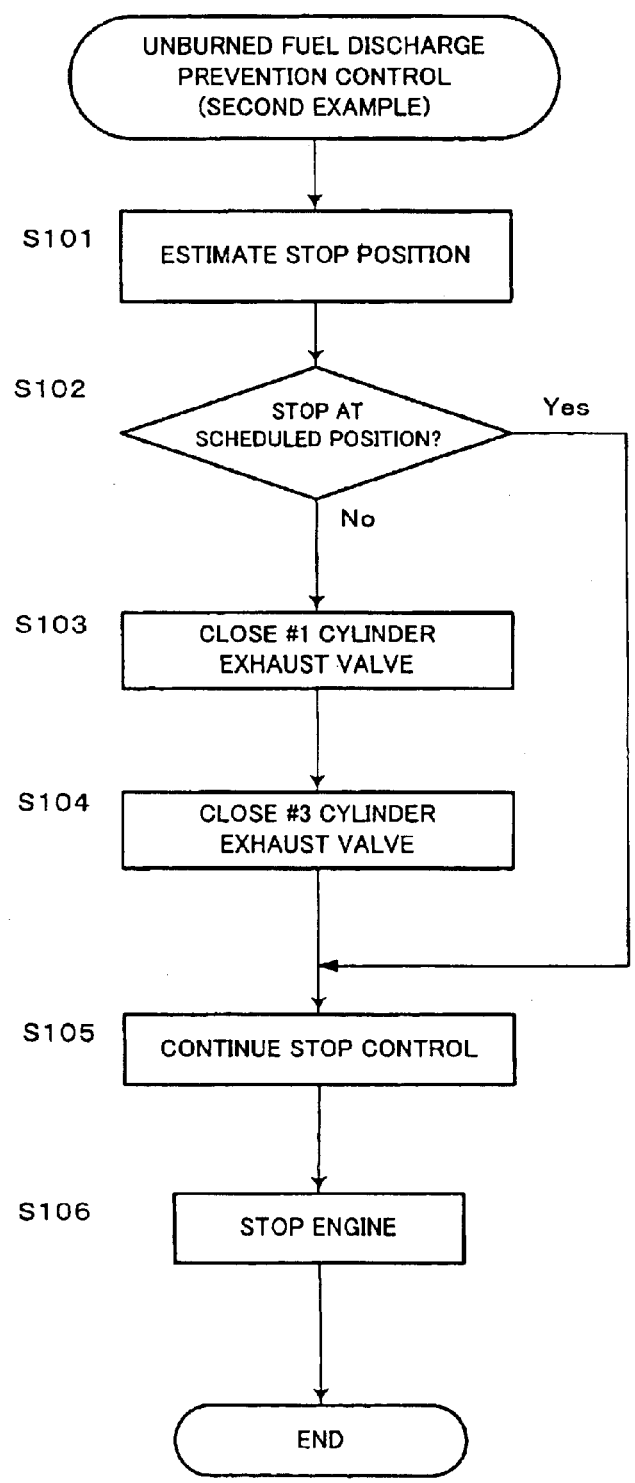
FIG. 14 shows a flow chart of the discharge prevention control of the unburned fuel according to the second example.

The second example will be explained with reference to FIG. 13 and FIG. 14. FIG. 13 shows a stroke chart showing a state of each cylinder just before the engine stop, and a time chart corresponding to the stroke chart. FIG. 13 shows a case that the engine stop control to the stop control position 101 fails, and the engine is shifted to the next stroke, wherein the engine stops at an actual stop position 102.

Explaining an outline with reference to FIG. 13, the control is executed to stop the engine in such a state that the fuel is previously introduced and sealed in the #1 cylinder which is the stop time expansion stroke cylinder and the #3 cylinder which is the stop time compression stroke cylinder, according to the aforementioned engine stop control. Namely, the stop control position 101 is the position of a broken line shown in FIG. 13, the ECU 70 executes the motoring so that the engine stops at the stop control position 101, and makes the inertia energy, which the engine 2 has, constant to stop the engine at the stop control position 101.

However, the number of engine revolution may be varied for some reason during execution of the engine stop control, and the engine may fail to actually stop at the stop control position 101 in some cases. The example in FIG. 13 shows a case in which the engine rotation exceeds the stop control position 101 and the engine stops at the actual stop position 102 as an example. Namely, the #1 cylinder stops in the exhaust stroke, and the #3 cylinder stops at the expansion stroke. In this case, the exhaust valve starts to open at a predetermined position 200 at a final stage of the expansion stroke in the #1 cylinder, and the unburned fuel previously sealed in the combustion chamber of the #1 cylinder is not combusted and discharged through the exhaust port 38.

On the other hand, the #3 cylinder is in the expansion stroke at the actual stop position 102 as shown in FIG. 13, but when the engine moves over the actual stop position 102 as shown in FIG. 13, the exhaust valve starts to open at a predetermined position 201 at the final stage of the expansion stroke, and the unburned fuel sealed in the combustion chamber is also discharged through the discharge port 38 without being combusted. As a result, the unburned fuel sealed in each of the combustion chambers of the above-described #1 cylinder and the #3 cylinder is discharged into the air, and therefore the emission is deteriorated.

Therefore, in the second example, in order to prevent the discharge of the unburned fuel, when it is determined that the engine cannot be stopped at the scheduled stop control position 101 during engine stop control, each of the exhaust valves of the #1 cylinder and the #3 cylinder is closed at predetermined timings so that the unburned fuel is not discharged through the exhaust port 38.

Next, the second example will be explained with reference to a flow chart shown in FIG. 14. This processing is to execute a control to close each of the exhaust valves of the #1 cylinder and the #3 cylinder at the predetermined timings based on the above-described method of the engine stop control, and the ECU 70 basically executes the processing based on the output signals from various kinds of sensors.

Explaining in order, in step S101, the ECU 70 estimates the stop position of each of the cylinders. The ECU 70 originally determines the executing timing of the motoring during the engine stop control, makes the inertia energy of the engine 2 constant and performs the engine stop control so as to stop the #3 cylinder at a predetermined position in the compression stroke. However, there is a case in which the #3 cylinder cannot be stopped at the predetermined position in the compression stroke as a result of receiving an influence by the variations of the engine revolution and the like at that time. Thus, in step S101, with considering such a case, the ECU 70 estimates the stop position of each of the cylinder.

Subsequently, in step S102, the ECU 70 determines (estimates) whether or not the engine stops at the stop control position 101 (see FIG. 13) as scheduled. When it is estimated that the engine stops at the stop control position 101 (step S102; Yes), the process goes to step S105 to continue the engine stop control, and thereafter the engine 2 stops (step S106). In this example, the #1 cylinder stops at the predetermined position in the expansion stroke, and the #3 cylinder stops at the predetermined position in the compression stroke. Namely, as shown in FIG. 13, the engine stops at the stop control position 101.

On the other hand, when it is estimated that the engine does not stop at the stop control position 101 (step S102; No), the ECU 70 closes the exhaust valve of the #1 cylinder (step S103). As a result, even if the #1 cylinder goes beyond the stop control position 101 and is shifted to the exhaust stroke at the time of stop, the unburned fuel sealed in the combustion chamber of the cylinder is not discharged through the exhaust port 38.

Subsequently, in step S104, the ECU 70 closes the exhaust valve of the #3 cylinder. Thus, if the #3 cylinder goes beyond the stop control position 101 shown in FIG. 13 and shifts to the predetermined position 201 in the expansion stroke at the time of engine stop, the unburned fuel sealed in the combustion chamber of the cylinder is not discharged through the exhaust port 38.

Subsequently, in step S105, the engine stop control is continued and thereafter the engine 2 stops (step S106).

Thus, in this example, #1 cylinder stops at the position in the exhaust stroke, and the #3 cylinder stops at the position in the expansion stroke. Namely, they stop at the actual stop position 102 shown in FIG. 13. However, since each of the exhaust valves of the #1 cylinder and the #3 cylinder is closed at the actual stop position 102 shown in FIG. 13, the unburned fuel sealed in the combustion chambers of the cylinders is not discharged into the air. As a result, deterioration of emission can be prevented.

THIRD EXAMPLE

In the third example, after the unburned fuel is sealed in each of the combustion chambers of the #1 cylinder which is the stop time expansion stroke cylinder and the #3 cylinder which is the stop time compression stroke cylinder, if the engine stop control cannot be executed as scheduled and it is estimated that the unburned fuel is discharged through the exhaust valves, the ignition processing is executed to combust the unburned fuel. As a result, even if the engine stop control fails, it is possible to prevent the unburned fuel from being discharged into the air, and hence to prevent deterioration of emission. The third example is especially effective for the engine which cannot freely control the opening and closing of the exhaust valve at arbitrary timings.

Figure 15:
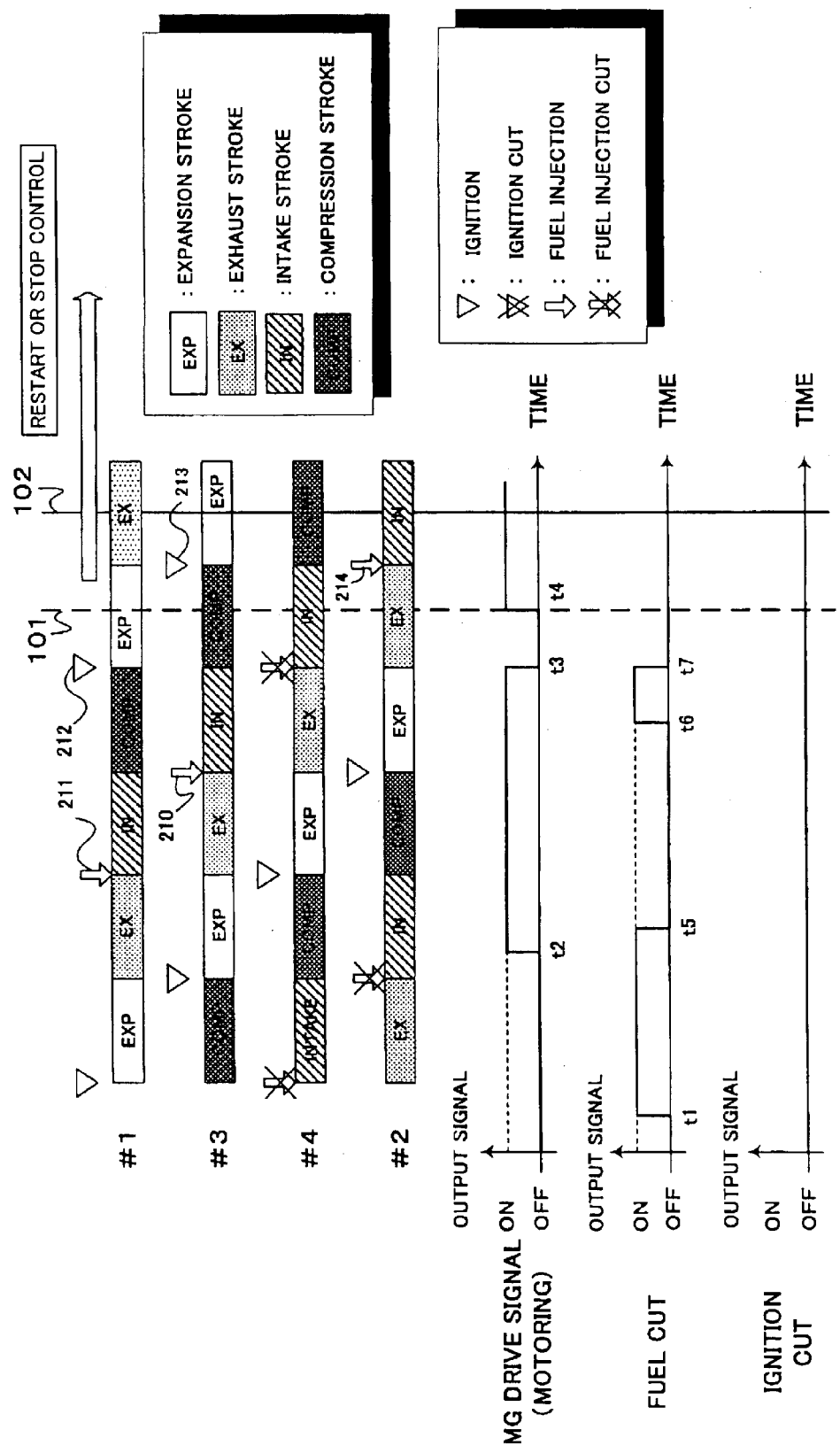
FIG. 15 shows a method of a discharge prevention control of an unburned fuel according to a third example.

The third example will be explained with reference to FIG. 15 and FIG. 16. FIG. 15 shows a stroke chart showing a state of each cylinder just before the engine stop, and a time chart corresponding to the stroke chart. The chart shown in FIG. 15 are similar to the chart shown in FIG. 13, but differs in that the #1 cylinder is ignited in the expansion stroke (reference numeral 212), that the #3 cylinder is ignited in the expansion stroke (reference numeral 213), and that the fuel injection (arrow 214) is performed in the intake stroke of the #2 cylinder after the fuel cut is performed at the time t6 to t7.

In the third example, the control similar to the aforementioned second example is basically performed. However, what is different from the second example is the method for preventing discharge of the unburned fuel. Namely, in the second example, the discharge of the unburned fuel from the exhaust port is prevented by closing each of the exhaust valves of the #1 cylinder and the #3 cylinder at the predetermined timing at the time of the engine stop control. In contrast, in the third example, the unburned fuel sealed in the combustion chamber of each of the cylinders is combusted at predetermined timings, whereby the discharge of the unburned fuel from the exhaust port is prevented.

Next, an operation in the third example will be explained with reference to FIG. 15.

The #1 cylinder stops at the predetermined position (stop control position 101) of the expansion stroke at the time of the engine stop by the engine stop control. For this reason, in the #1 cylinder, the fuel injection is performed in the intake stroke as shown in FIG. 15 (arrow 211). The #3 cylinder stops at the predetermined position (stop control position 101) of the compression stroke at the time of the engine stop by the engine stop control. Consequently, in the #3 cylinder, the fuel injection is performed in the intake stroke (arrow 210) as shown in FIG. 15.

Thereafter, if it is determined that the engine stop control cannot be performed as scheduled, and hence the #1 cylinder cannot stop in the expansion stroke and the #3 cylinder cannot stop in the compression stroke, the ignition is performed in the #1 cylinder in the expansion stroke (reference numeral 212). As a result, even if the engine stop control to stop in the expansion stroke fails and the stop position is shifted to the exhaust stroke side due to variation of the engine revolution and the like, the unburned fuel sealed in the combustion chamber of the #1 cylinder is not discharged through the exhaust port 38.

Similarly, the ignition is also performed for the #3 cylinder in the expansion stroke (reference numeral 213). As a result, even if the engine stop control to stop in the compression stroke fails and the stop position is shifted to the expansion stroke due to variation of the engine speed and the like, the unburned fuel sealed in the combustion chamber of the #3 cylinder is not discharged through the exhaust port 38.

Subsequently, in the #2 cylinder, the fuel injection is performed in the intake stroke (arrow 124). Thereafter, when each of the cylinders is shifted from the compression stroke to the expansion stroke, the ignition is performed one after another, and the operation of the engine 2 is continued.

As described above, in this example, after the fuel injection to the stop time compression stroke cylinder and the stop time expansion stroke cylinder is performed for the engine start control, if it is determined that the engine cannot be stopped at the position as scheduled by the engine stop control, the unburned fuel is combusted. As a result, if the engine stops beyond the scheduled stop control position 101, the discharge of the unburned fuel can be prevented.

In FIG. 15, the ignition is performed for the unburned fuel sealed in each of the combustion chambers of the #1 cylinder and the #3 cylinder at predetermined timings, and the operation of the engine is continued (i.e., the idling stop is not performed). In this case, if the engine stop condition is still satisfied thereafter, the engine stop control may be executed again. Alternatively, the idling engine stop control itself may be stopped. In that case, the engine remains in operation while the vehicle stops.

After the unburned fuel is combusted, even if fuel injection in the other cylinder (for example, see the arrow 214 in FIG. 15) is not performed and the engine is stopped, there is no problem because the unburned fuel is not discharged.

Next, the control of the third example will be explained with reference to a flow chart shown in FIG. 16. This processing is to perform the ignition for the unburned fuel sealed in the combustion chambers of the #1 cylinder and the #3 cylinder at the predetermined timings based on the method of the aforementioned engine stop control, and the ECU 70 basically executes the processing based on the output signals from various kinds of sensors. The same steps as the flow chart shown in the second example will be explained in brief.

First, like in the second example, the ECU 70 estimates the stop position in step S301. When it is determined that the engine stops at the scheduled stop position, i.e., when the engine stops at the stop control position 101 (step 202; Yes), the ECU 70 continues the engine stop control (step S307) and stops the engine (step S308). As a result, the engine stops at the stop control position 101 shown in FIG. 15 as scheduled.

Meanwhile, when it is determined that the engine cannot stop at the scheduled stop position due to some reason (step S302; No), the ECU 70 determines whether the #1 cylinder is at the compression stroke top dead center or not (step S303). When the #1 cylinder reaches the compression stroke top dead center, the ECU 70 controls the igniter to executes ignition for the #1 cylinder (step S304). Consequently, even if the #1 cylinder shifts to the exhaust stroke side thereafter, the discharge of the unburned fuel from the exhaust port 38 can be prevented.

Subsequently, the ECU 70 determines whether the #3 cylinder is at the compression stroke top dead center or not (step S305) When the #3 cylinder is at the compression stoke top dead center, the ECU 70 controls the igniter to executes ignition for the #3 cylinder (step S306). As a result, even if the #3 cylinder shifts to a predetermined position in the expansion stroke thereafter, the discharge of the unburned fuel from the exhaust port 38 can be prevented.

Figure 16:
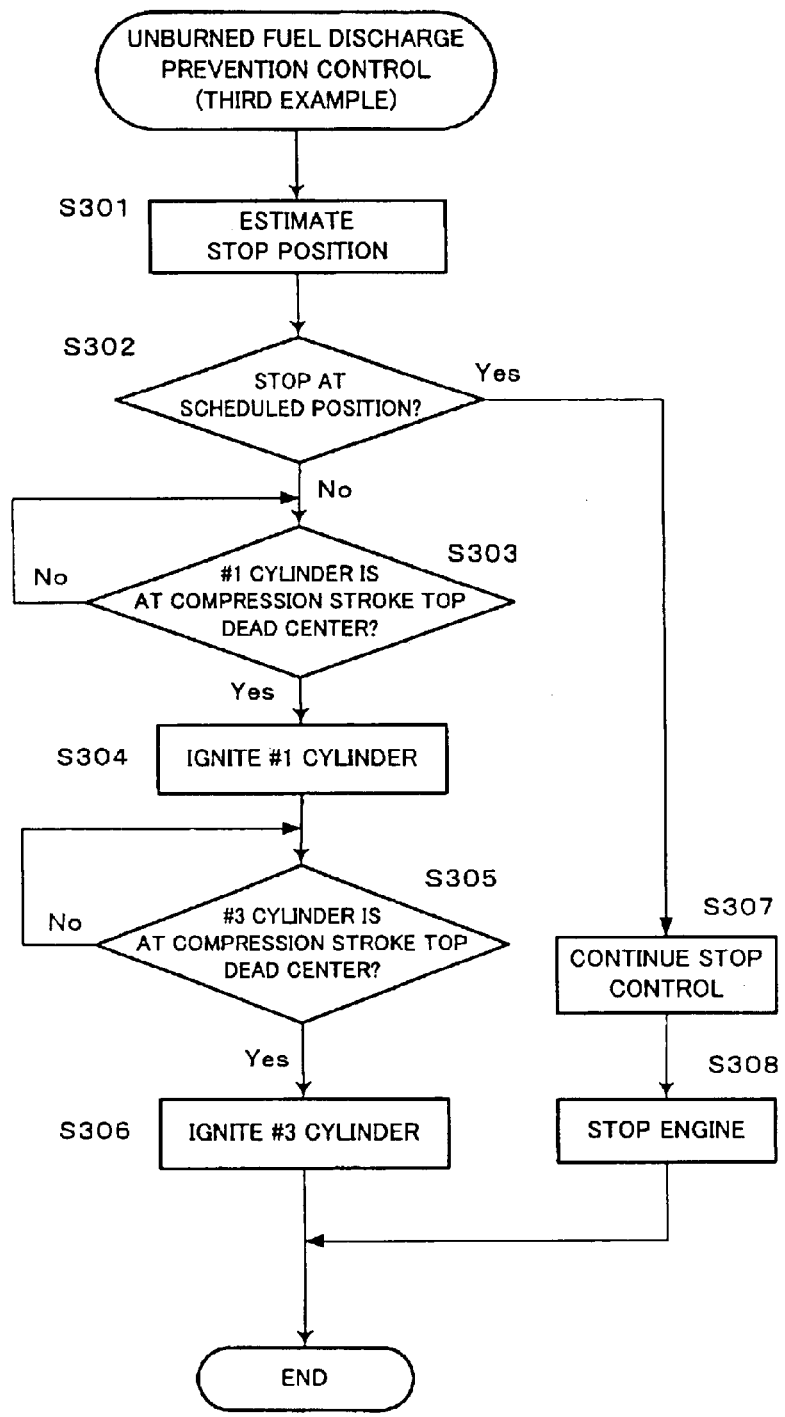
FIG. 16 shows a flow chart of the discharge prevention control of the unburned fuel according to the third example.

In the example in FIG. 16, the ignition is performed when the respective pistons reach the top dead center in the #l cylinder and the #3 cylinder (steps S303 to S306). However, when the operation of the engine is not continued and the engine is stopped as it is, it is possible to suppress the vibration at the time of engine stop by performing ignition just before the top dead center.

As explained above, in this example, the unburned fuel sealed in each of the combustion chambers of the stop time compression stroke cylinder and the stop time expansion stroke cylinder at the predetermined timings, whereby the discharge of the unburned fuel into the air through the exhaust port can be prevented. As a result, deterioration of emission can also be prevented.

Modified Example

In each of the above-described examples, the fuel is previously sealed in both of the stop time compression stroke cylinder and the stop time expansion stroke cylinder in the engine stop control. However, the present invention can be applied to the engine stop control in which the fuel is sealed in either one of the cylinders. In that case, the compulsory combustion of the unburned fuel (examples 1 and 3) and closing the exhaust valve (example 2) may be performed only for the cylinder in which the fuel is previously sealed.

As explained above, according to the engine stop control apparatus of the internal combustion engine according to the present invention, even if the ignition switch is turned off in the state that the unburned fuel is sealed in the combustion chamber of the specific cylinder during the idling stop, the unburned fuel is combusted in a predetermined period, and therefore the unburned fuel can be prevented from being discharged through the exhaust port. The vibration which may occur by combusting the unburned fuel can be suppressed more effectively by rotating the motor generator in the counter rotation direction to the rotation direction of the crankshaft rotated by the combustion pressure.

When it is estimated that the engine cannot be stopped at the scheduled engine stop position in the state that the unburned fuel is sealed in the combustion chamber of the specific cylinder, the exhaust valve corresponding to the specific cylinder is closed, or the unburned fuel is combusted, whereby the unburned fuel can be prevented from being discharged through the exhaust port. Consequently, the unburned fuel can be prevented from being discharged into the air, and the deterioration of emission can also be prevented.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-035036 filed on Feb. 13, 2003 including the specification, claims, drawings and summary is incorporated herein by reference in its entirety.

What is claimed is:

1. A stop and start control apparatus of an internal combustion engine, comprising:
   a stop control unit for performing a stop control by supplying fuel into a combustion chamber of cylinder which is in a compression stroke and/or in an expansion stroke at a time of stopping the engine;
   an unburned fuel discharge preventing unit for preventing discharge of the fuel when it is estimated that the fuel in the combustion chamber of the cylinder is discharged in an unburned state, at a time of the stop control of the engine;
   a combusting unit for combusting, at a time of starting the engine, the fuel supplied to the combustion chamber of the cylinder; and
   a starting unit for starting the engine by utilizing combustion pressure obtained from the combusting unit and/or a motor.

2. The stop and start control apparatus of the internal combustion engine according to claim 1, wherein it is estimated that the fuel is discharged in the unburned state when an ignition switch is turned off during the stop control of the engine.

3. The stop and start control apparatus of an internal combustion engine according to claim 1, wherein the stop control unit further comprises:
   a unit for supplying fuel, during operation of the engine, into the combustion chamber of the cylinder which is in the compression stroke and/or the expansion stoke; and
   a unit for adjusting a crank angle position so that the engine stops at the cylinder which is in the compression stroke and/or the expansion stroke, at the time of stopping the engine.

4. The stop and start control apparatus of the internal combustion engine according to claim 1, wherein the unburned fuel discharge preventing unit prevents the fuel supplied to the combustion chamber of the cylinder which is in the compression stroke or the expansion stroke, when it is estimated that the cylinder which is in the compression stroke or the expansion stroke at the time of stopping the engine passes an exhaust stroke.

5. The stop and start control apparatus of the internal combustion engine according to claim 1, wherein the engine further comprises an opening and closing unit for opening and closing an exhaust valve, and when it is estimated that the cylinder, which is in the compression stroke or the expansion stroke at the time of stopping the engine, passes the exhaust stroke, the opening and closing unit prevents the fuel supplied to the combustion chamber of the cylinder, which is in the compression stroke or the expansion stroke, from being discharged.

6. The stop and start control apparatus of the internal combustion engine according to claim 1, wherein the unburned fuel discharge preventing unit prevents discharge of the fuel by combusting the fuel by the combusting unit before the fuel supplied to the combustion chamber of the cylinder which is in the compression stroke or the expansion stroke is discharged, when it is estimated that the cylinder which is in the compression stroke or the expansion stroke at the time of stopping the engine passes the exhaust stroke.

7. The stop and start control apparatus of the internal combustion engine according to claim 1,
   wherein the starting unit starts the engine by utilizing combustion pressure obtained from the combusting unit when a first starting condition is established; and
   wherein the unburned fuel discharge preventing unit prevents discharge of the fuel by combusting the fuel by the combusting unit before the fuel inside the combustion chamber of the cylinder is discharged in the unburned state.

8. The stop and start control apparatus of the internal combustion engine according to claim 1,
   wherein the starting unit starts the engine by utilizing combustion pressure obtained from the combusting unit and the motor, and starting supply of the fuel to the engine in a predetermined period, when a second starting condition is established; and
   wherein the unburned fuel discharge preventing unit prevents discharge of the fuel by combusting the fuel by the combusting unit, before the fuel in the combustion chamber of the cylinder is discharged in an unburned state.

9. The stop and start control apparatus of the internal combustion engine according to claim 7, further comprising:
   a torque absorbing unit for absorbing an engine torque generated when the fuel in the combustion chamber of the cylinder is combusted by the combusting unit.

10. The stop and start control apparatus of the internal combustion engine according to claim 9, wherein the torque absorbing unit applies torque by the motor in a counter rotation direction to a rotation direction of the engine rotated by receiving the torque generated by combustion of the fuel.

11. The stop and start control apparatus of the internal combustion engine according to claim 1, wherein the engine further comprises a unit for displaying an alarm at a time of execution of an operation by the unburned fuel discharge preventing unit.

12. The stop and start control apparatus of the internal combustion engine according to claim 11, wherein the engine comprises a unit for stopping the engine after the unburned fuel discharge preventing unit finishes the operation.

* * * * *